US011776542B1

(12) United States Patent
Bueche et al.

(10) Patent No.: US 11,776,542 B1
(45) Date of Patent: Oct. 3, 2023

(54) SELECTING DIALOG ACTS USING CONTROLLED RANDOMNESS AND OFFLINE OPTIMIZATION

(71) Applicant: Amazon Technologies, Inc., Seattle, WA (US)

(72) Inventors: Edward Bueche, Pleasanton, CA (US); Francois Mairesse, Berkeley, CA (US); Torbjorn Vik, San Francisco, CA (US); Tao Ye, Millbrae, CA (US)

(73) Assignee: Amazon Technologies, Inc., Seattle, WA (US)

( * ) Notice: Subject to any disclaimer, the term of this patent is extended or adjusted under 35 U.S.C. 154(b) by 84 days.

(21) Appl. No.: 17/217,943

(22) Filed: Mar. 30, 2021

(51) Int. Cl.
*G10L 15/26* (2006.01)
*G10L 15/22* (2006.01)
*G06N 20/00* (2019.01)
*G10L 15/08* (2006.01)

(52) U.S. Cl.
CPC ............ *G10L 15/22* (2013.01); *G06N 20/00* (2019.01); *G10L 2015/088* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 9,679,568 B1 | 6/2017 | Taubman et al. | |
| 10,127,908 B1* | 11/2018 | Deller | H04L 67/02 |
| 10,388,274 B1 | 8/2019 | Hoffmeister | |
| 10,614,800 B1* | 4/2020 | McMahon | G06F 3/0484 |
| 10,789,944 B2* | 9/2020 | Siva Kumaran et al. | G06N 20/00 |
| 10,839,159 B2* | 11/2020 | Yang | G10L 15/22 |
| 10,885,091 B1 | 1/2021 | Meng et al. | |
| 10,984,780 B2* | 4/2021 | Bellegarda | G06N 7/01 |
| 10,992,764 B1 | 4/2021 | Esmaeili et al. | |
| 11,012,575 B1* | 5/2021 | Leblang | G06Q 10/109 |
| 11,204,787 B2* | 12/2021 | Radebaugh | G06F 16/951 |
| 11,587,567 B2 | 2/2023 | Carmeli et al. | |
| 2017/0102915 A1 | 4/2017 | Kuscher et al. | |
| 2017/0337199 A1* | 11/2017 | Kogan | H04L 51/02 |
| 2017/0364519 A1* | 12/2017 | Beller | G06N 7/01 |
| 2018/0232435 A1 | 8/2018 | Papangelis et al. | |
| 2018/0315415 A1 | 11/2018 | Mosley et al. | |
| 2018/0322131 A1 | 11/2018 | Haviv et al. | |
| 2018/0329998 A1 | 11/2018 | Thomson et al. | |
| 2018/0330721 A1 | 11/2018 | Thomson et al. | |
| 2019/0103127 A1 | 4/2019 | Tseretopoulos et al. | |
| 2019/0115027 A1 | 4/2019 | Shah et al. | |
| 2019/0130904 A1 | 5/2019 | Homma et al. | |
| 2019/0318724 A1* | 10/2019 | Chao | G10L 15/22 |
| 2019/0371303 A1* | 12/2019 | Siva Kumaran et al. | G06N 20/00 |

(Continued)

*Primary Examiner* — Seong-Ah A Shin
(74) *Attorney, Agent, or Firm* — Athorus, PLLC

(57) ABSTRACT

Dialog acts (e.g., questions) are selected for voice browsing by a machine learning model trained to identify a dialog act that is most likely to lead to a desired outcome. When an invocation is received from a user, a context of the invocation is determined, and a pool of dialog acts is scored based on the context by a machine learning model. Dialog acts are selected from the pool and presented to the user in accordance with a randomization policy. Data regarding the dialog acts and their success in achieving a desired outcome is used to train one or more machine learning models to select dialog acts in response to invocations.

20 Claims, 15 Drawing Sheets

(56) References Cited

U.S. PATENT DOCUMENTS

| | | |
|---|---|---|
| 2020/0043485 A1 | 2/2020 | Tonetti et al. |
| 2020/0082829 A1 | 3/2020 | Taubman et al. |
| 2020/0105273 A1 | 4/2020 | O'Donovan |
| 2020/0184959 A1* | 6/2020 | Yasa ..................... G06F 40/30 |
| 2021/0019357 A1* | 1/2021 | Bennett ................. G06F 40/20 |
| 2021/0042657 A1* | 2/2021 | Tiruveedhula ..... G06Q 10/0637 |
| 2021/0049996 A1 | 2/2021 | Chae |
| 2021/0082420 A1 | 3/2021 | Kraljic et al. |
| 2021/0110821 A1* | 4/2021 | Lim ....................... G06V 40/10 |
| 2021/0142791 A1* | 5/2021 | Penta ..................... G06F 40/30 |
| 2021/0326756 A1* | 10/2021 | Khaleghi .............. G06F 18/211 |
| 2021/0357172 A1 | 11/2021 | Sinesio et al. |
| 2022/0148580 A1 | 5/2022 | Kumar et al. |
| 2022/0262348 A1* | 8/2022 | Shinde .................. G06N 3/045 |

\* cited by examiner

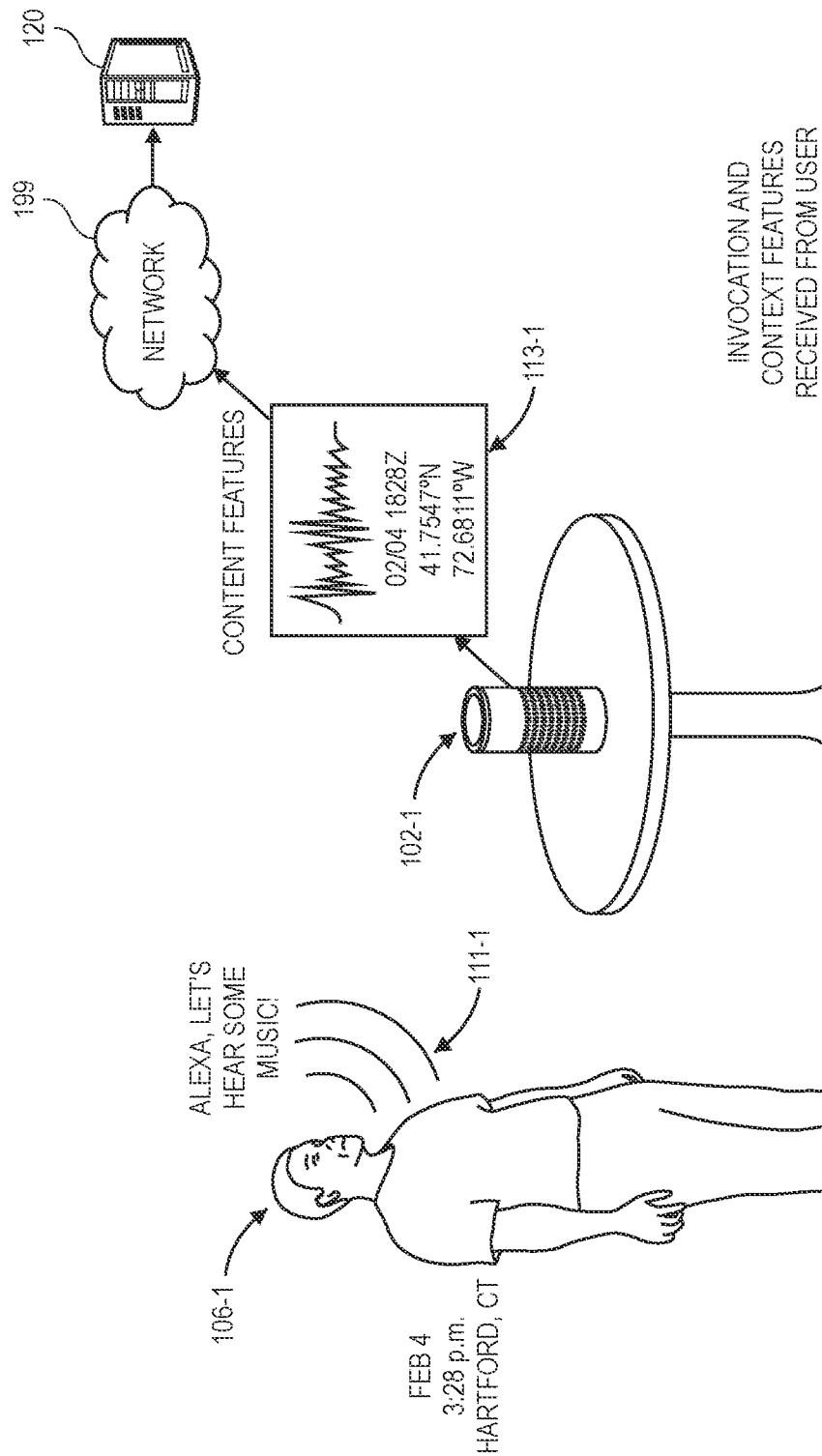

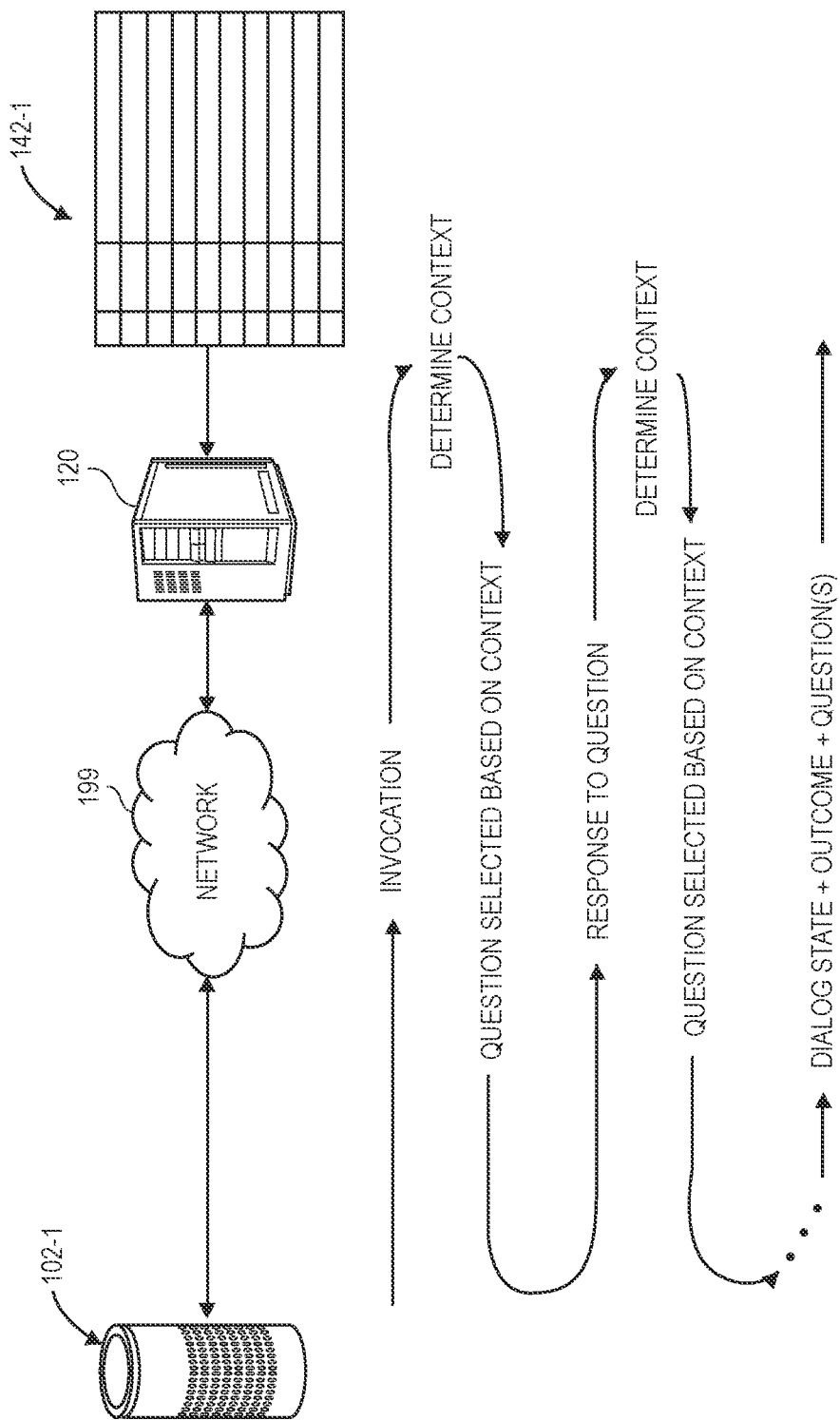

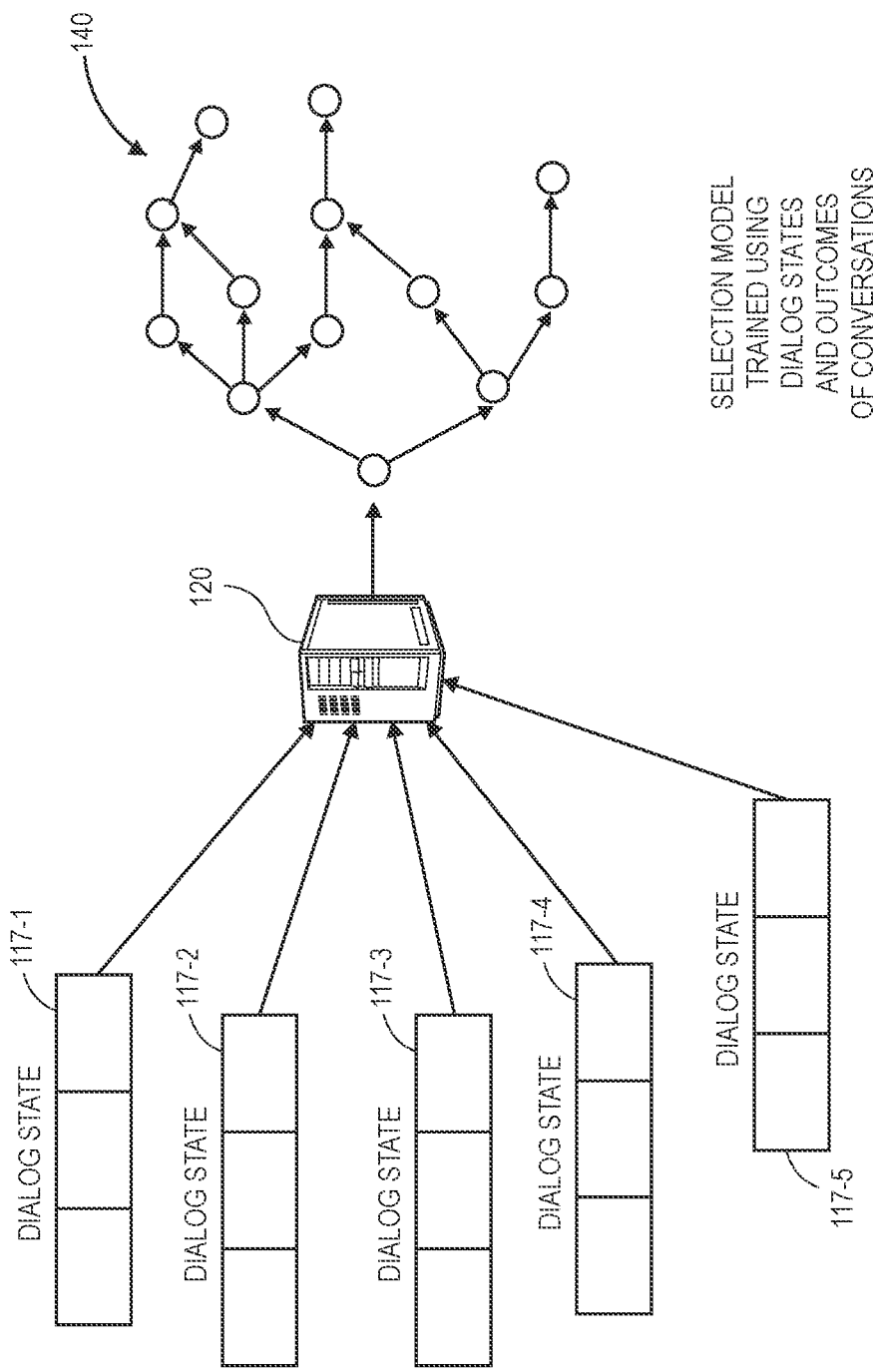

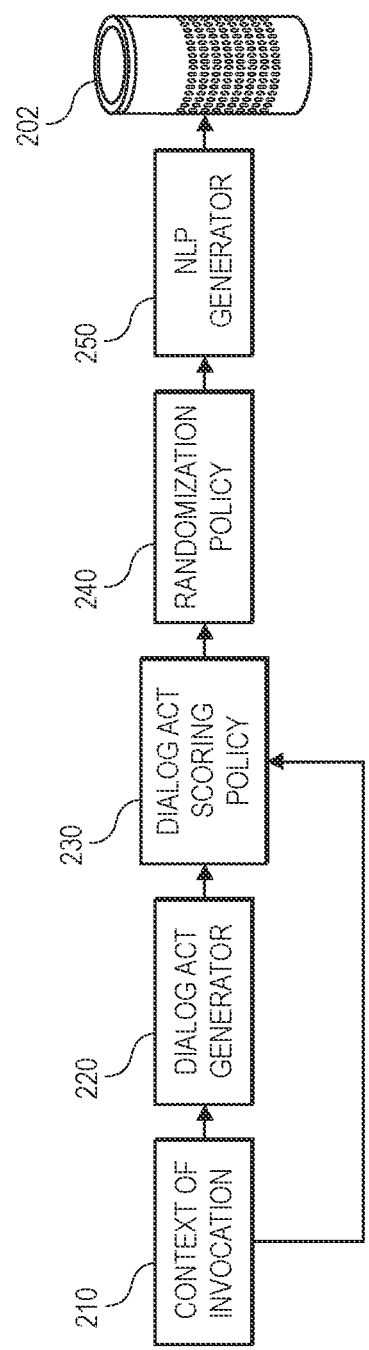

SELECTING DIALOG ACTS USING CONTROLLED RANDOMNESS AND OFFLINE OPTIMIZATION

BACKGROUND

Voice browsing is a process by which users request information not by strokes of a keyboard, or by gestures with a mouse or touchscreen, but with one or more utterances that are spoken aloud to a computer system operating a conversational agent. A voice browser is a system or a process that presents an interactive voice interface to a user by spoken words and other sounds, e.g., a vocal equivalent of a web browser, and engages a user in a conversation in pursuit of a goal. Information that may be requested by voice browsing is limited only by a number or type of input/output devices that are provided on a voice browsing system or available to a voice browsing process. During a voice browsing experience, audio information may be presented to a user via a speaker, and visual information may be presented to the user on a display.

Unlike instances when a user knows precisely what he or she wants, such as where the user calls out a specific media file or item by name, e.g., "Alexa, play Old Town Road by Lil Nas X," in a single utterance, voice browsing permits the user to interact with the computer system to narrow a field of options, to designate one subset of the options as desired, to designate another subset of the options as undesired, or to otherwise advance toward a goal. When interacting with a computer system operating a conversational agent, a user may invoke a conversation with one or more commands, and execute any number of turns, in order to verbally express the goal to the computer system, and enable the computer system to identify content, e.g., music or other media, or another item, that best satisfies the goal. For example, upon receiving an invocation from a user, the system may respond with any number of dialog acts, such as questions, to elicit information about the user's preferences, to determine a context of the invocation, to confirm a statement expressed within or a meaning of an utterance, or to present one or more options (e.g., media or items) to the user. A conversation may be deemed successful or to have otherwise satisfied a goal when an outcome of the conversation satisfies one or more metrics, such as whether the user permitted the system to play a media file for at least a predetermined period of time, or whether the user ultimately purchased an item that was described or recommended by the system.

Voice browsing is one technique for helping a user to identify what he or she wants, even if the user did not know what he or she wanted when he or she began to interact with a computer system operating a conversational agent. The selection of dialog acts, or questions, presented to a user of the computer system, or an order in which such dialog acts or questions are presented, may be critically important in assisting the user in this endeavor. While every interaction received from a user in response to a question or another dialog act may potentially refine or constrain a goal that has been identified or predicted for the user, asking too many questions, or asking a relevant question at an inappropriate time, may cause the user to abandon or abort the goal, or to otherwise experience an unacceptably low level of satisfaction.

BRIEF DESCRIPTION OF THE DRAWINGS

FIGS. 1A through 1F are views of aspects of one system for selecting dialog acts in accordance with implementations of the present disclosure.

FIG. 2 is a flow diagram of one system for training machine learning models in accordance with implementations of the present disclosure.

DETAILED DESCRIPTION

As is set forth in greater detail below, the present disclosure is directed to selecting dialog acts for voice browsing using controlled randomness and machine learning. More specifically, one or more implementations of the systems and methods of the present disclosure are directed to receiving invocations to initiate conversations from users, and determining one or more context features from the invocations. A context of an invocation may be characterized based on context features determined from the invocation and used to calculate estimated reward scores for each of a pool of dialog acts, or questions, that may be presented to a user that presented the invocation. The scores may be measures of a likelihood that a given one of the pool of dialog acts will result in a successful outcome of a conversation, which may be determined according to any type or form of success metric. The scores may be calculated using any type or form of scoring policy, i.e., a machine learning model that is trained to present dialog acts to users based on a context of an invocation.

The pool of dialog acts may be ranked based on their respective estimated reward scores, and presented to the user based according to a probability (e.g., a propensity) calculated based on such rankings or scoring, or in accordance with a randomization policy. In reply to some invocations, or in reply to responses to some dialog acts, a highest-scoring or highest-ranked dialog act is presented to a user. In reply to other invocations or responses to other dialog acts, however, a dialog act other than a highest-scoring or highest-ranked dialog act is presented to the user, according to a propensity defined by the randomization policy. After a conversation that is initiated by an invocation and includes one or more dialog acts or responses thereto has been concluded, a dialog state may be used to train one or more selection policies, e.g., machine learning models, to calculate estimated reward scores for dialog acts based on contexts, and to present dialog acts selected based on such reward scores to users in such contexts. The dialog states may include, but need not be limited to, information regarding a user that provided an invocation, e.g., information maintained in a profile of the user, as well as dialog acts presented to the user, propensities of each of such dialog acts, responses received in reply to the dialog acts, and an outcome of the conversation.

Figure 1B:
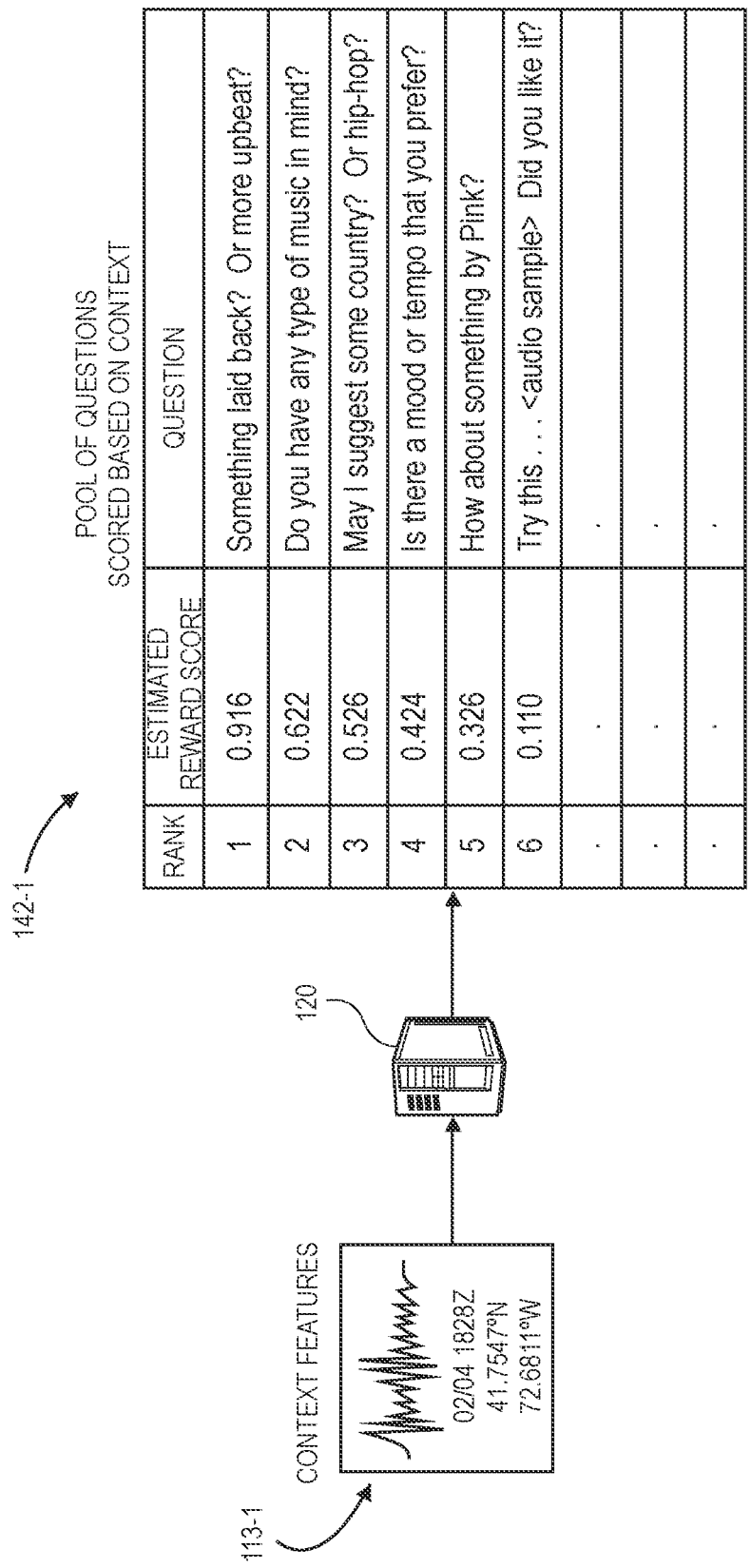

Referring to FIGS. 1A through 1F, views of aspects of one system for selecting dialog acts in accordance with implementations of the present disclosure are shown. As is shown in FIG. 1A, a user 106-1 of a smart speaker (or a mobile device, an automobile, or any other computer device) 102-1 provides an utterance 111-1, viz., "Alexa, let's hear some music!" to the smart speaker 102-1. Upon receiving audio signals including the utterance 111-1, the smart speaker 102-1 may process the audio signals to determine whether such signals include a "wake word," or a predetermined word or set of words (e.g., a phrase) that, when recognized within audio signals captured by the smart speaker 102-1, activates the smart speaker 102-1 and causes the smart speaker 102-1 to execute one or more applications or functions based on other aspects of the audio signals. After confirming that a wake word is detected in the audio signals, the smart speaker 102-1 processes such signals and any other information or data that may be known regarding a context associated with the utterance 111-1, e.g., one or more context features, such as any information or data that may be known, predicted or determined regarding the user 106-1 or the utterance 111-1, or conditions under which the utterance 111-1 was provided by the user 106-1.

The smart speaker 102-1 then transmits data 113-1 including context features or any other descriptors of the utterance 111-1 to a server 120 (or any other computer device) over a network 199, which may include the Internet, in whole or in part. The context features may be variables or other values that represent one or more attributes of the utterance 111-1, including but not limited to frequencies or wavelengths, intensities, durations of sounds included in the utterance 111-1, as well as numbers of arguments, or other descriptors of such sounds, or any other information or data regarding such sounds.

Upon receiving the data 113-1, the server 120 may execute one or more speech recognition modules for recognizing and interpreting the utterance 111-1 within the data 113-1. For example, portions of the data 113-1 may be compared with models of sounds (e.g., sub-word units or phonemes) or sequences of such sounds to identify words of the utterance 111-1, including but not limited to a wake word, and to recognize any commands, viz., a request for music, expressed within the utterance 111-1.

As is shown in FIG. 1A, the server 120 may process the data 113-1 to characterize a context of the utterance 111-1. In some implementations, the data 113-1 may identify the context features included in the data 113-1, and characterize a context of the utterance 111-1, or the invocation embodied therein based on the context features. For example, the context features may describe, for example, a goal associated with the utterance 111-1, e.g., to receive music, as is shown in FIG. 1A, as well as frequencies or wavelengths, intensities, durations of sounds included in the utterance 111-1, numbers of arguments, other descriptors, or any other information or data regarding such sounds. Alternatively, or additionally, the context features may identify a time, a date or a location from which the utterance 111-1 was provided by the user 106-1, as well as a number of arguments or other terms included in the utterance 111-1.

The context features may include or describe attributes of any prior utterances or invocations received from the user 106-1, whether such utterances identified an acceptance or a rejection of any particular content, or included a positive or negative inference regarding any particular content. In some implementations, the context features may also indicate whether the user 106-1 is a subscriber to one or more content sources, identify the smart speaker 102-1 or an application by which the utterance 111-1 was received, represent a level of confidence that an invocation was accurately identified in the utterance 111-1, or represent a length of a conversation including the utterance 111-1, e.g., a number of turns prior to the utterance 111-1.

As is further shown in FIG. 1B, upon determining a context associated with the utterance 111-1 based on the data 113-1, the server 120 may score a pool of questions (or other dialog acts) 142-1 based on the context. For example, the server 120 may calculate a score representing an estimated reward of each of such questions in advancing the conversation toward a goal. In some implementations, the scores may have values ranging between zero and one, e.g., that a given question is entirely unhelpful or lacking in utility for advancing the conversation toward the goal in the given context (viz., zero), or that the given question is useful and has utility for advancing the conversation toward the goal in the given context (viz., one). The pool of questions 142-1 may include dialog acts suggesting a mood, a genre, or an artist or group, as well as a request that the user 106-1 identify a mood or a genre. In some other implementations, one or more of the dialog acts may be accompanied by a selected audio sample, and may request an indication as to whether the user 106-1 liked the selected audio sample. In still other implementations, the pool of questions 142-1 may include one or more dialog acts intended to draw additional information from the user 106-1, such as an identification of any other personnel within earshot of the smart speaker 102-1, as well as one or more dialog acts intended to confirm that the utterance 111-1 was properly understood by the smart speaker 102-1 or the server 120.

In some implementations, the pool of questions 142-1 may be scored by providing the data 113-1 or portions thereof to a scoring policy operating a machine learning model. The scoring policy may be configured to receive at least some of the data 113-1 and the pool of questions 142-1 as inputs, and to calculate a reward score or other measure of the utility of each of the pool of questions 142-1 in advancing the conversation toward a successful outcome. In some implementations, the pool of questions 142-1 may then be ranked in order based on values of their respective scores, and propensities, or probabilities that each of the pool of questions 142-1 will be asked in the context of the utterance, may be determined for each of the pool of questions 142-1 based on the scores or ranks.

Once the pool of questions 142-1 is scored and ranked based on the context associated with the utterance 111-1, a conversation may be begun by presenting one of the pool of questions 142-1 to the user 106-1 by way of the smart speaker 102-1, and the processes of identifying questions, scoring the questions, and selecting questions according to a randomization policy may be repeated until the conversation has concluded. As is shown in FIG. 1C, data regarding an invocation provided by a user to the smart speaker 102-1 is transmitted to the server 120 over the network 199, and a context is determined from the data regarding the invocation, as discussed above. A question (or another dialog act) is selected from the scored pool of questions 142-1 according to a randomization policy, by which propensities of the questions 142-1 of the pool are fully or uniformly random or otherwise randomized, and data for presenting the selected question to the user is returned to the smart speaker 102-1 by the server 120. When the user provides a response to the selected question to the smart speaker 102-1, e.g., another utterance, which may include one or more words in reply to the selected question, or another command, data regarding the response is transmitted by the smart speaker 102-1 to the server 120, which may determine a context of the response.

Another pool of questions 142-1 may then be identified and scored, e.g., according to a scoring policy, based on the context of the response received from the user. A question (or another dialog act) is selected from the newly scored pool of questions 142-1, and data for presenting the selected question to the user is returned to the smart speaker 102-1 by the server 120. The conversation may continue based on each response received from the user, with the identification of pools of questions, the scoring of the pools of questions according to the scoring policy, and the selection of questions from the scored pools according to the randomization policy, until the conversation reaches an outcome that may be successful or unsuccessful, e.g., the conversation is terminated by the user. After the outcome is determined, a dialog state of the conversation, an outcome of the conversation, and the questions asked during the conversation, are stored by the system 120.

Figure 1D:
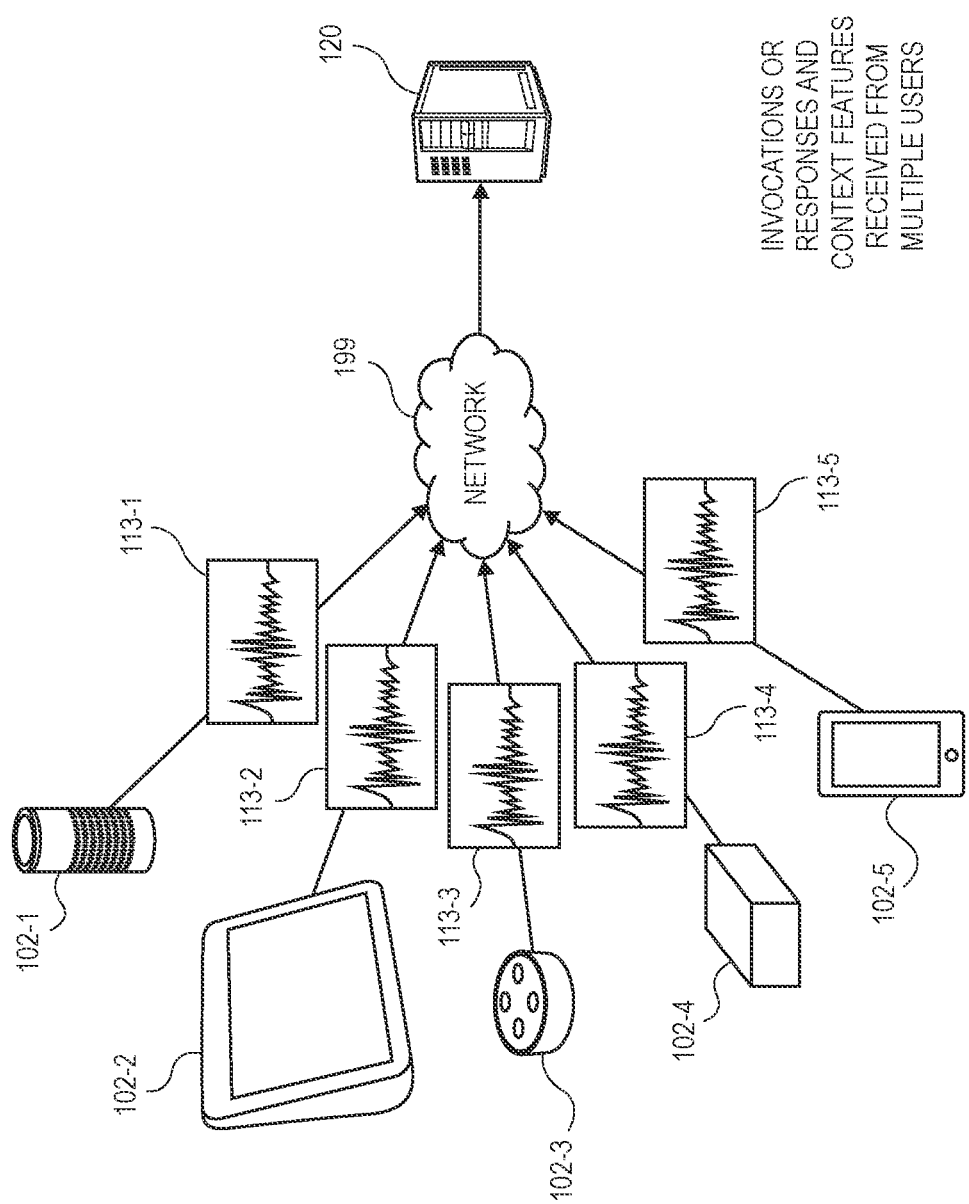
Figure 1E:
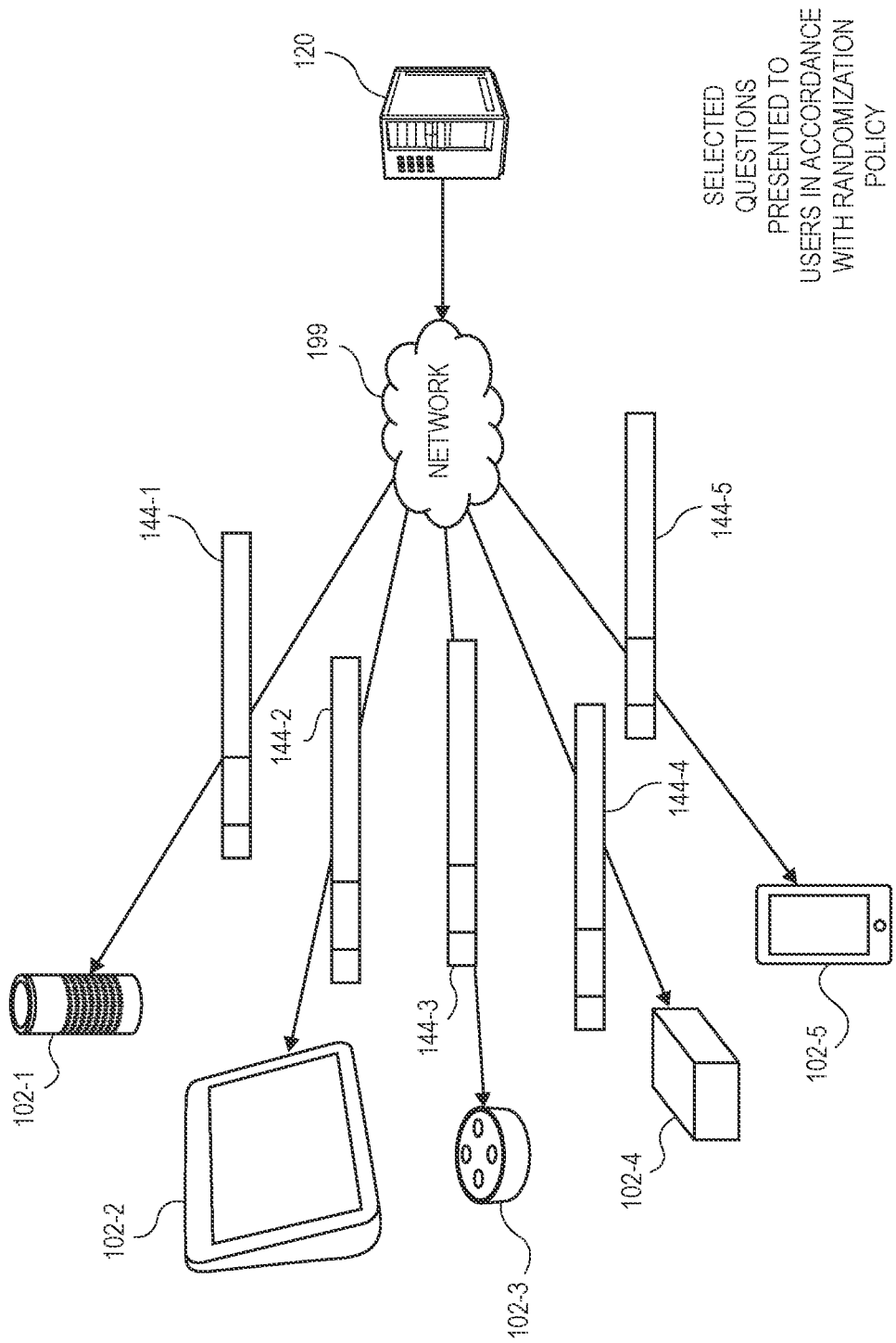

The initiation of conversations in response to invocations or responses to questions, the scoring of pools of questions based on contexts, and the selection of questions according to randomization policies, as shown in FIGS. 1A through 1C, may be performed in association with any number of invocations received from any number of users and from any number of other devices, and for any number of responses to questions presented to such users by such other devices. For example, as is shown in FIG. 1D, data 113-1, 113-2, 113-3, 113-4, 113-5 including utterances made by users and/or context features determined from such utterances is received from the smart speaker 102-1, and also from a smart speaker 102-2, a smart speaker 102-3, a streaming device 102-4 and a mobile device 102-5, respectively. The data 113-1, 113-2, 113-3, 113-4, 113-5 may represent invocations by users, or responses to questions presented to users, and contexts may be determined from context features included in the data 113-1, 113-2, 113-3, 113-4, 113-5 at each turn of conversations initiated in response to the invocations, until such conversations have concluded. As is shown in FIG. 1E, the server 120 returns scored questions 144-1, 144-2, 144-3, 144-4, 144-5 selected for presentation to the users by the devices 102-1, 102-2, 102-3, 102-4, 102-5 in response to invocations or responses in accordance with a randomization policy. The questions are scored in pools based on contexts of invocations or responses received from users, e.g., by scoring policies, and selected according to randomization policies.

As is shown in FIG. 1F, after a predetermined number of conversations have been concluded, dialog states 117-1, 117-2, 117-3, 117-4, 117-5 of each of such conversations are used along with the dialog acts presented during the conversations and outcomes of the conversations to train one or more machine learning models 140 to act as selection policies, and to calculate estimated reward scores of questions based on contexts of invocations or responses received from users. The machine learning models 140 may take any type or form, including but not limited to reward regressors, artificial neural networks, multi-armed bandit algorithms, boosting algorithms (e.g., XGBoost), regression models, decision trees, deep learning systems, nearest neighbor methods or analyses, factorization methods or analyses, random forest algorithms, support vector machines, K-means clustering analyses, similarity measures, or any other techniques. The dialog states 117-1, 117-2, 117-3, 117-4, 117-5 may include, but need not be limited to, information regarding a user that provided an invocation, e.g., information maintained in a profile of the user, as well as dialog acts presented to the user, propensities of each of such dialog acts, responses received in reply to the dialog acts, and an outcome of the conversation.

For example, in a training mode, upon receiving sets of training inputs, the machine learning models 140 may generate sets of outputs in the form of positive or negative scores, and the outputs may be compared to one or more training outputs (e.g., labels or annotations) associated with the training inputs. One or more loss functions (or cost functions) may be used to calculate or generate values based on deviations between the outputs and the training outputs. In some implementations, values calculated or generated by the loss functions based on deviations between outputs returned by the machine learning models 140 in response to one of the training inputs and one of the training outputs (e.g., a ground truth) corresponding to the one of the training inputs may be backpropagated to the machine learning models 140, or otherwise used to train or update the machine learning models 140. Based on values calculated or generated by the loss functions, one or more attributes of the machine learning models 140, may be adjusted in order to train the machine learning models 140, to a maximum practicable extent, as evidenced by reductions in values calculated or generated by the loss functions.

Subsequently, one or more of the machine learning models 140 may be used as a selection policy to evaluate data received from one or more computer systems, e.g., smart speakers, and to identify dialog acts to ask users in response to invocations based on their respective estimated rewards with respect to one or more goals. In some implementations, the dialog states 117-1, 117-2, 117-3, 117-4, 117-5 may be used to train multiple machine learning models 140, and a highest performing or most accurate one of the machine learning models 140 may be used as a selection policy. Alternatively, two or more of the machine learning models 140 may be trained and utilized as selection policies.

A voice browsing conversation is typically represented or modeled as a sequence of turns in a context, and responses provided by a user in each of the turns may be used to refine an identified or predicted goal of the user, which may be represented as a set of one or more constraints. For example, where a user is interested in listening to music, a system operating a conversational agent may learn that the customer likes '90s hip hop but dislikes country, that the user prefers music with upbeat or energetic moods to laid back or depressed moods, or that the user is a fan of Adele but not a fan of Shania Twain. A system operating a conversational agent, or another system in communication with that system, may maintain a set of search results (e.g., candidate search results) that are consistent with such constraints, and in furtherance of that goal.

At each turn, the system must choose from one of a plurality of dialog acts, e.g., questions. For example, one dialog act may present a sample of media to a user, e.g., audio or visual media, as a question with language such as, "You might like this," followed by the playing of the sample. Another dialog act may be to recommend one or more selected genres to the user, and may be presented as a question with language such as "How'd you like some techno?" Other dialog acts may involve a request for a confirmation of information identified in audio signals previously received from the user, which may be presented as a question with language such as, "You'd like to hear Soundgarden, right?" or a request for additional information from the user, which may be presented as a question with language such as "Do you have anything in mind?" or "Can you think of a mood or tempo you'd prefer?" Still other dialog acts may involve a suggestion of a mood, which may be presented as a question with language such as "Feel like something chill? Or something peppy?" or a request to identify or describe other people who are present with or around the user, which may be presented as a question with language such as "Who are we hanging out with today? Friends? Family?" With each response received from the user, the system may determine whether to execute another dialog act, e.g., to ask another question, to begin playing a selected media file, or to take another action.

Referring to FIG. 2, a flow diagram of one system for training machine learning models in accordance with implementations of the present disclosure is shown. As is shown in FIG. 2, a context 210 of a communication (e.g., an invocation) may be determined based on audio signals received from a user, on any basis, including but not limited to one or more context features determined from the communication. The communication may be received from a user, in the form of an utterance represented in the communication, which may be captured by a computer system (e.g., a smart speaker, a mobile device, an automobile, or others).

The context 210 is provided to a dialog act generator 220, which may generate a set of dialog acts (e.g., questions) based on the context 210. The dialog act generator 220 identifies one or more questions or other dialog acts (e.g., a pool or a set) that are acceptable for presentation to the user that provided the communication, given the context 210. In some implementations, each of the dialog acts generated by the dialog act generator 220 may be considered in reply to the communication, e.g., in reply to an invocation, or in reply to any responses received in response to one or more dialog acts. In some implementations, a size or a number of dialog acts generated by the dialog act generator 220 may be reduced following one or more responses received from the user, or on any other basis.

The dialog acts generated by the dialog act generator 220, and the context 210, are provided to a dialog act scoring policy 230, which may calculate estimated reward scores or other metrics based on a probability that each of such dialog acts will result in a successful outcome in response to a conversation including the communication, based on the context 210. In some implementations, the dialog acts may be ranked and sorted based on their respective reward scores, e.g., from highest-scoring or highest-ranking to lowest-scoring or lowest-ranking.

Once the dialog acts generated by the dialog act generator 220 have been scored and ranked, based on the context 210, the dialog acts are provided to a randomization policy 240, which is established to select dialog acts to be presented to users in response to any number of interactions. In some implementations, the randomization policy 240 may call for asking a highest-ranked or highest-scored dialog act in reply to some interactions, and a dialog act other than the highest-ranked or highest-scored dialog act in reply to other interactions. In some implementations, the randomization policy may include a set of one or more rules that may override such scorings or rankings, such as for one or more communications that are received in a given context. In some implementations, the randomization policy 240 may be an exploration algorithm, such as a softmax exploration algorithm, or a Boltzmann exploration algorithm.

The randomization policy 240 may be purely random, e.g., a fully or uniformly randomized policy, such that propensities that each of a pool of n dialog acts generated by the dialog act generator 220 will be selected are equal to one another, e.g., 1/n. In some implementations, the randomization policy 240 may require a highest-ranked or highest-scored dialog act to be asked in reply to one predetermined percentage or share of communications, and a randomly selected dialog act to be asked in reply to another predetermined percentage or share of communications.

Once a dialog act has been selected in accordance with the randomization policy 240, the selected dialog act is provided to a natural language processing (or "NLP") generator 250, which selects language for presenting the dialog act to the user via a smart speaker 202 (or another computer system). The process shown in the flow diagram of FIG. 2 may be repeated for each communication received from any number of users in a conversation, e.g., in reply to an invocation, or in reply to each response received from such users in response to a dialog act. Moreover, the process shown in the flow diagram of FIG. 2 may be utilized or repeated for any number of conversations.

Figure 3A:
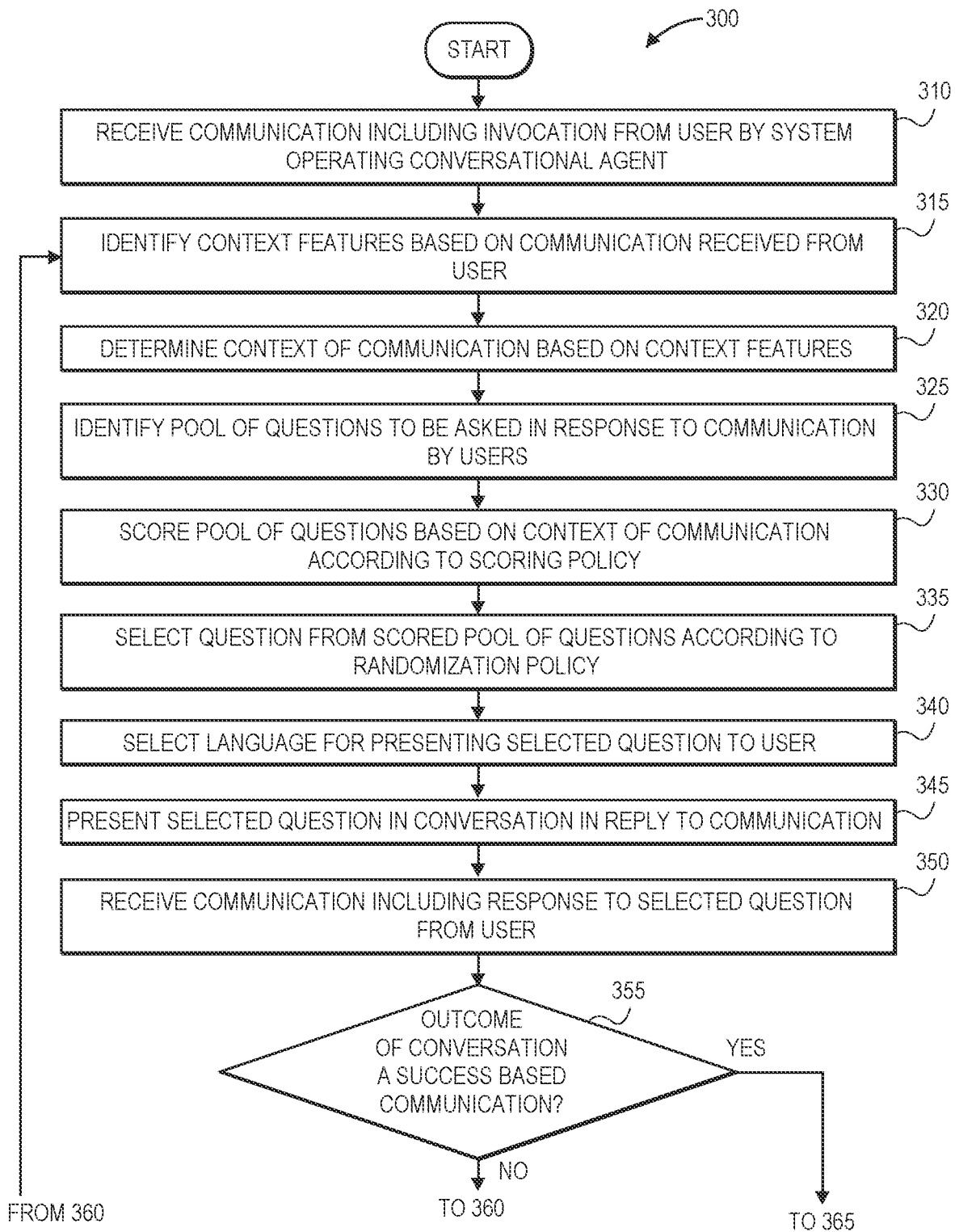
FIGS. 3A and 3B are a flow chart of one process for selecting dialog acts in accordance with implementations of the present disclosure.
Figure 3B:
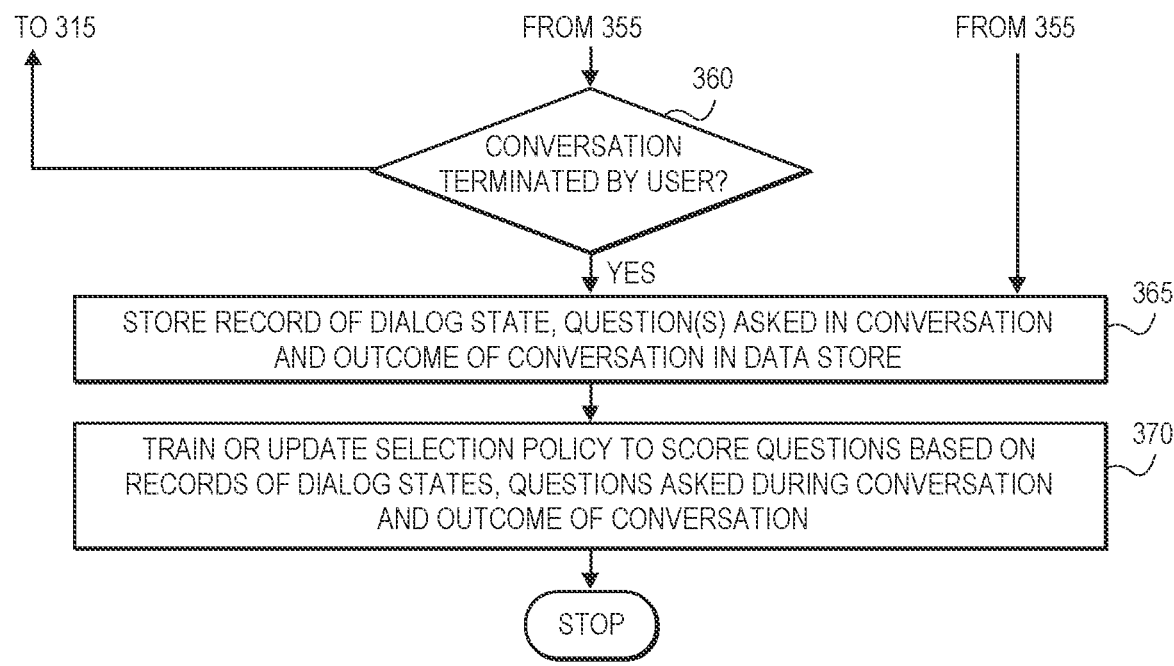

As is discussed above, a machine learning tool may be trained to select dialog acts, e.g., questions, to be emitted by a computer system, such as a smart speaker, a mobile device, an automobile or any other computer system that is operating a conversational agent in response to an invocation identified in an utterance received from a user. Referring to FIGS. 3A and 3B, a flow chart 300 of one process for training machine learning tools in accordance with implementations is shown.

At box 310, a communication including an invocation is received by a system operating a conversational agent, e.g., from a user of the system, which may be a smart speaker, a mobile device, or an automobile, or any other type or form of system. For example, the invocation may be a general or specific command spoken by a user such as "help me find some music," or "recommend some music," and may be included within an utterance expressed in audio data captured by one or more audio sensors of the system. In some implementations, the utterance may include or be preceded by a "wake word," or a predetermined word or set of words (e.g., a phrase) that, when recognized within audio data captured by such sensors, activates the system and causes the system to execute one or more applications or functions based on other aspects of the audio data. For example, a balance of the audio data, other than a wake word, may be processed to identify one or more phonemes or words of the utterance and to determine the invocation. The invocation may be received by the system in the form of audio data captured by the system, e.g., by one or more microphones or other sensors provided on the system, or by one or more sensors provided by another system in communication with the system, such as a smart speaker or another device in communication with the system over one or more networks. The audio data may be further processed to derive an intent or a desired action associated with the invocation, as well as any pertinent pieces of information that may allow the system or another service to act in response to the intent or to otherwise execute the action.

At box 315, one or more context features are identified based on the communication received from the user, e.g., from the one or more utterances of the communication, from one or more utterances that were previously received from the user, or from one or more utterances received from other users. For example, the context features may be variables or values that may be interpreted to characterize a context of a communication, e.g., an invocation or a response to a dialog act. In some implementations, the context features may represent one or more attributes of an utterance by a user, or a communication including the utterance. The context features may describe, for example, a goal associated with the utterance, e.g., to identify music or other content of a specific genre, era, artist or mood, as well as a number of arguments or other terms included in the utterance or the communication. In some implementations, contents of the utterance or the communication may be used to define sets of terms for constructing a search query, and one or more of the context features may further include results obtained based on the search query. Furthermore, in some implementations, the search query may be augmented to include one or more terms that are known or believed to be associated with the user, e.g., one or more genres, eras, artists or moods previously expressed by or identified for the user.

In some implementations, the context features may include or describe attributes of any prior utterances or communications received from the user, e.g., whether such utterances or communications included or identified any number of genres, eras, artists or moods, as well as whether such utterances identified an acceptance or a rejection of any particular content, or included a positive or negative inference regarding any particular content. In some implementations, the context features may also indicate whether the user is a subscriber to one or more sources of content, or identify a device or an application from which the utterance or the communication was received. In some implementations, one or more of the context features may also represent a level of confidence that the invocation was accurately identified within an utterance. In some implementations, one or more of the context features may represent a length of a conversation that includes the communication, e.g., a number of turns prior to the invocation.

At box 320, a context of the communication is determined based on the context features determined at box 315. The context may be determined based on any number of the context features, individually or collectively, of the communication and, alternatively, context features of any communications previously received from the user.

At box 325, a pool of questions (or a set of questions, or any other dialog acts) to be asked in response to the communication is identified. Each of the questions may be represented by a feature set indicative of a type of the question, such as whether the question constitutes a suggestion that is being offered, whether the question constitutes an elicitation that is being offered, whether the question identifies an entity (e.g., an artist or group) that is being offered, or whether the question is a request for a confirmation as to content identified within an utterance or the invocation. The feature set may further identify content of the question, e.g., an argument within the question, or a number of arguments within the question. In some implementations, the feature set may include, but need not be limited to, an indication of an affinity of the user with an entity being suggested or elicited, or an indication of a degree to which content matches one or more goals of a user.

For example, in some implementations, the pool of questions may include dialog acts suggesting a mood, e.g., "Something laid back?" or "Something upbeat?" In some other implementations, the pool of questions may include dialog acts suggesting a genre, such as "Would you like Alternative Rock?" or "May I recommend some Electronic Music?" In still other implementations, the pool of questions may include dialog acts suggesting an artist or group, such as "I see you are in Seattle. Would you like to hear some Nirvana?" Likewise, in some implementations, the pool of questions may include dialog acts expressly requesting that the user identify a mood, e.g., "Can you think of a mood or tempo you prefer?" In some other implementations, one or more of the pool of questions may be accompanied by a selected audio sample, and may ask whether the user liked the selected audio sample. In some other implementations, the pool of questions may include one or more questions intended to draw additional information from the user, such as "Who is listening with you? Friends? Family?" or one or more questions intended to confirm that an utterance or an invocation included therein was properly understood by the system or the conversational agent. For example, a question may include a repeat of the utterance or the invocation, followed by a question such as "Right?" or "Is that what you said?"

At box 330, the pool of questions is scored based on the context of the communication determined at box 325, according to a scoring policy. For example, each of the questions in the pool may be ranked or scored by their respective estimated rewards or reward scores, as determined based on outputs received from a machine learning model, or in any other manner. From the context determined at box 320, or on any other basis, one or more features of a goal of the user in providing the communication may be identified or predicted. For example, based on the context of the communication, it may be determined that the user has a goal of listening to music, or purchasing one or more items. A reward score may be a probability that a given one of the questions will result in a successful conversation, or will achieve an identified or predicted goal, e.g., a playing of selected media for at least a predetermined period of time, or a purchase of an item. The identified or predicted goal may be expressed by any number of constraints, e.g., data representing a desired or disliked genre, mood, tempo or artist, among others.

At box 335, a question is selected from the scored pool of questions according to a randomization policy. For example, the randomization policy may be purely random, e.g., fully randomized, such that each of a set of questions that is available for asking in response to a communication is equally likely to be selected, and propensities of each of the set of questions are equal, e.g., 1/n for a set of n questions. Alternatively, where the set of questions is ranked or scored according to any number of factors, the randomization policy may call for asking a highest-ranked or highest-scored question for a first predetermined number or percentage of communications or conversations, and a question other than the highest-ranked or highest-scored question for a second predetermined number or percentage of communications or conversations. In some implementations, the randomization policy may include a set of one or more rules that may override such rankings or scorings, such as for one or more of the n invocations that are received in a given context. In some implementations, the randomization policy may be a softmax exploration algorithm, or any other exploration algorithm.

In some implementations, the selected question may be a highest-ranked or highest-scored question of the scored pool. In some other implementations, the selected question may be a question other than the highest-ranked or highest-scored question of the scored pool. A randomization policy may be configured to determine, for a single communication, or for multiple communications, whether the selected question is the highest-ranked or highest-scored question, or whether the selected question is a question other than the highest-ranked or highest-scored question.

At box 340, language for presenting the selected question to the user is selected. For example, the system may structure the selected question for presentation in a natural language or sentence structure. In some implementations, a natural language or sentence structure of a single question may take any forms, e.g., "Can I recommend Pearl Jam?"

"Do you like Pearl Jam?" or "Would you like to hear some Pearl Jam right about now?" One of such forms may be selected on any basis. The language may be selected by one or more processors provided on the system that captured the acoustic data, such as by one or more microphones or other sensors provided on the system, or by another system in communication with the system. At box 345, the selected question is presented to the user in a conversation in reply to the communication, e.g., in the language selected at box 340. The selected question may be presented in the selected language by one or more audio output components, e.g., speakers, provided on the system that captured the acoustics data, or another system in communication with the system.

At box 350, a communication including a response to the selected question is received from the user, and at box 355, whether an outcome of the conversation is a success based on the communication is determined. For example, upon receiving the selected question in the language selected at box 345, the user may provide a response in the form of audio feedback, which may be processed to determine whether a goal identified or predicted based on features determined from a context of the invocation has been met, according to one or more metrics (e.g., success metrics), or on any other basis. For example, one or more metrics may be established for determining whether a conversation was successful or unsuccessful. In some implementations, where a user plays a selection of media (e.g., music) for at least a threshold period of time following the selected question, or elects to purchase an item after hearing the selected question, the conversation may be presumed to have been successful. Alternatively, where the user does not play the selected media for at least the threshold period of time, or does not elect to purchase an item, the conversation may be presumed to have been unsuccessful, and one or more further constraints identified based on the audio feedback may be used to further refine an identified or predicted goal of the user.

If the outcome of the conversation was not a success following the presentation of the selected question, then the process advances to box 360, where whether the user has terminated the conversation is determined. In some implementations, a user may directly terminate a conversation where the response is an utterance that includes one or more specified commands, such as "stop," or "go home." In some other implementations, the user may indirectly terminate a conversation where the response includes an invocation of another conversation. For example, where the invocation indicates an interest in listening to music, and the response provided by the user to the selected question includes an invocation indicating an interest in weather, news, trivia or comedy, the user may be presumed to have terminated the conversation by abandoning or aborting his or her interest in listening to music.

If the conversation has not been terminated, then the process advances to box 315, where one or more context features are identified based on the communication received from the user in response to the selected question, and to box 320, where a context of the communication is determined based on the context features. The one or more context features may be the same type of context features that were identified in response to the communication including the invocation, or one or more other context features.

If the outcome of the conversation is determined to be a success based on the communication received at box 350, or after the conversation is determined to have been terminated at box 360, then the process advances to box 365, where a record of a dialog state, the questions asked of the user during the conversation, and an outcome of the conversation, is stored in a data store. For example, the record of the dialog state may include an identifier of a goal of the conversation determined from the invocation or from any specific constraints identified in audio feedback received from the user in response to the questions, including audio feedback most recently received from the user, and an order or a history of the questions, along with any other relevant information or data regarding the conversation or an outcome thereof. The record of the dialog state may also include, but need not be limited to, information regarding a user that provided an invocation, e.g., information maintained in a profile of the user, as well as questions presented to the user, propensities of each of such questions, responses received in reply to the questions, and an outcome of the conversation.

At box 370, a selection policy is trained or updated to score questions for usefulness based on the records of the dialog state, the questions in response to the invocation, and the outcomes of the conversations and the process ends. The selection policy may be defined by one or more machine learning models, which may include a random-logging policy baseline, a rule-based policy baseline, a reward regressor, a boosting algorithm (e.g., XGBoost), a multi-armed bandit algorithm, a log linear model, a tree algorithm, or others.

Figure 4A:
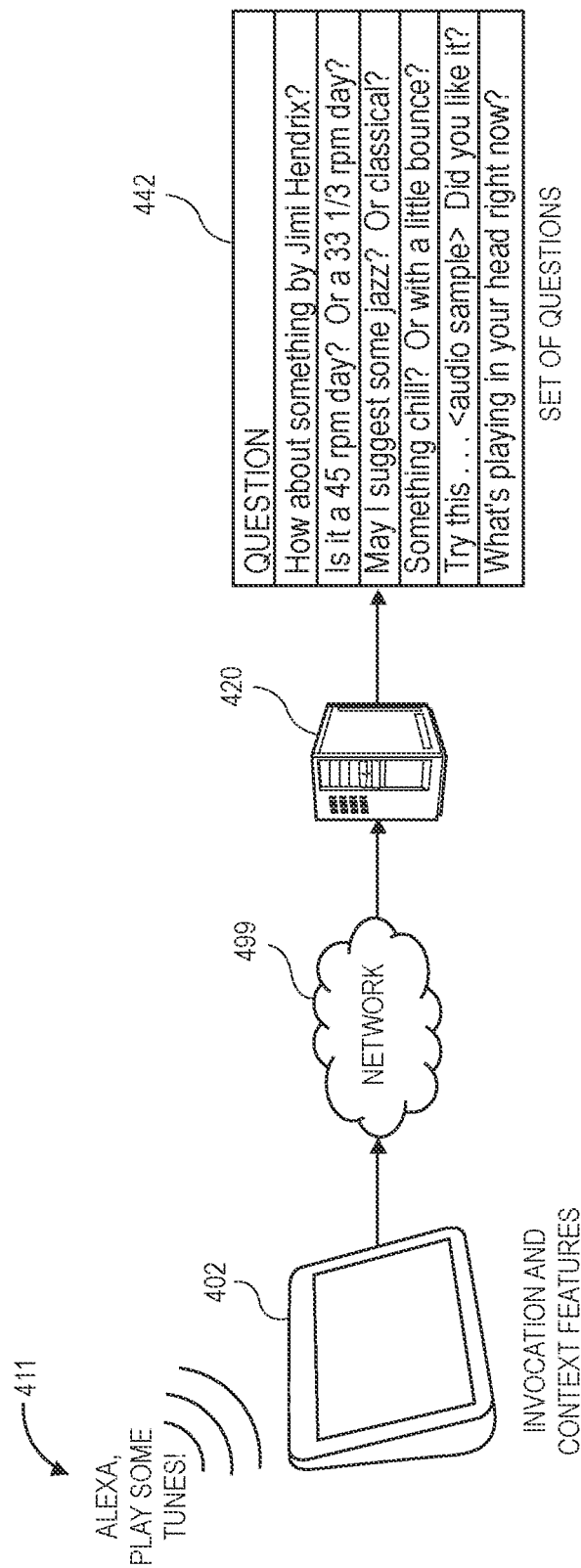
FIGS. 4A and 4B are views of aspects of one system for selecting dialog acts in accordance with implementations of the present disclosure.
Figure 4B:
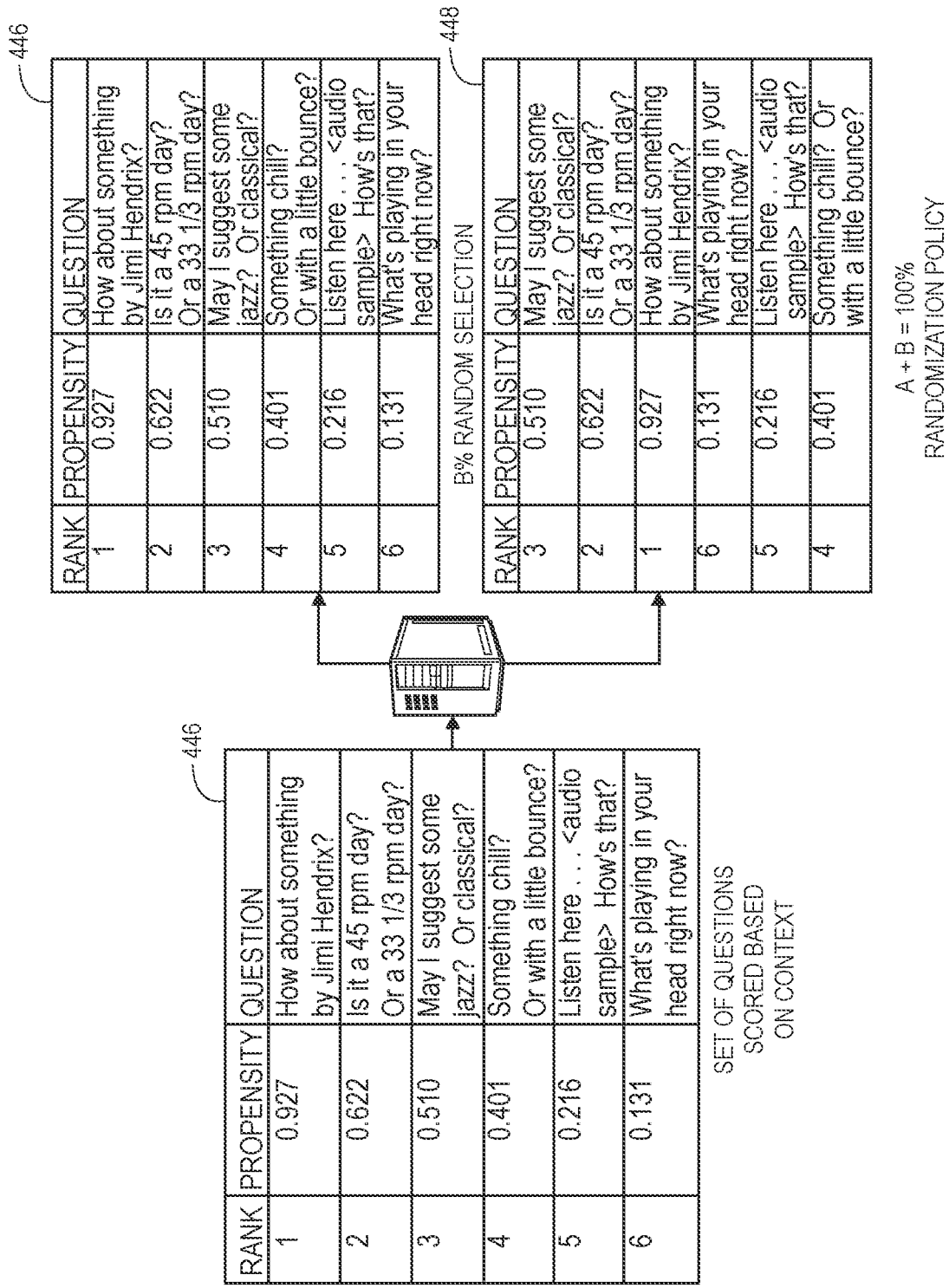

Referring to FIGS. 4A and 4B, views of aspects of one system for selecting dialog acts in accordance with implementations of the present disclosure are shown. As is shown in FIG. 4A, a smart speaker 402 (or other computer device) receives one or more utterances 411, viz., "Alexa, play some tunes!" from a user requesting the playing of music. Upon receiving audio signals including the utterance 411, the smart speaker 402 may determine that the utterance 411 includes a wake word, and identify one or more context features associated with the utterance 411. The smart speaker 402 then provides data including the utterance 411 and any context features, e.g., variables or values representing one or more attributes of the utterance 411, including but not limited to a goal associated with the utterance 411, a time, a date or a location from which the utterance 411 was provided, or any other information regarding the utterance 411 or other utterances, to a server 420 over a network 499. Upon receiving the data, the server 420 processes the data to determine a context of the utterance 411, and to identify a set (or a pool) of questions 442 that are acceptable for presentation to the user that provided the invocation, given the context.

As is shown in FIG. 4B, the server 420 scores the set of questions 442 according to a scoring policy, e.g., by estimating rewards that may result for each of the set of questions 442 in a context determined based on the data, and generates a ranked set of questions 446. The ranked set of questions 446 may include each of the set of questions 442 identified on the context, or a subset of the set of questions 442, e.g., fewer than all of the set of questions 442. The estimated reward scores may be calculated based on the context, such as by providing the set of questions 442 and one or more context features to a selection policy, e.g., a machine learning model, as inputs, and calculating the estimated rewards based on outputs received in response to the inputs.

As is also shown in FIG. 4B, a randomization policy may be established for the ranked set of questions 446. In some implementations, a randomization policy may rely on a highest-ranked or highest-scored question of the ranked set of questions 446 in reply to an invocation or a response to a prior dialog act for a percentage A of communications received from the user in the context, viz., for A % of the communications, and may select a question other than the highest-ranked or highest-scored question from a set of questions 448 in reply to an invocation or a response to a prior dialog act for a percentage B of communications received from the user in the context, viz., for B % of the communications. In some other implementations, the randomization policy may include a set of one or more rules that may override rankings or scorings in a given context, such as where a highest-ranked or highest-scored question has a reward score that is significantly greater than a second-highest-ranked or second-highest-scored question, or where two highest-ranked or highest-scored questions have reward scores that are substantially equal to one another.

Figure 5:
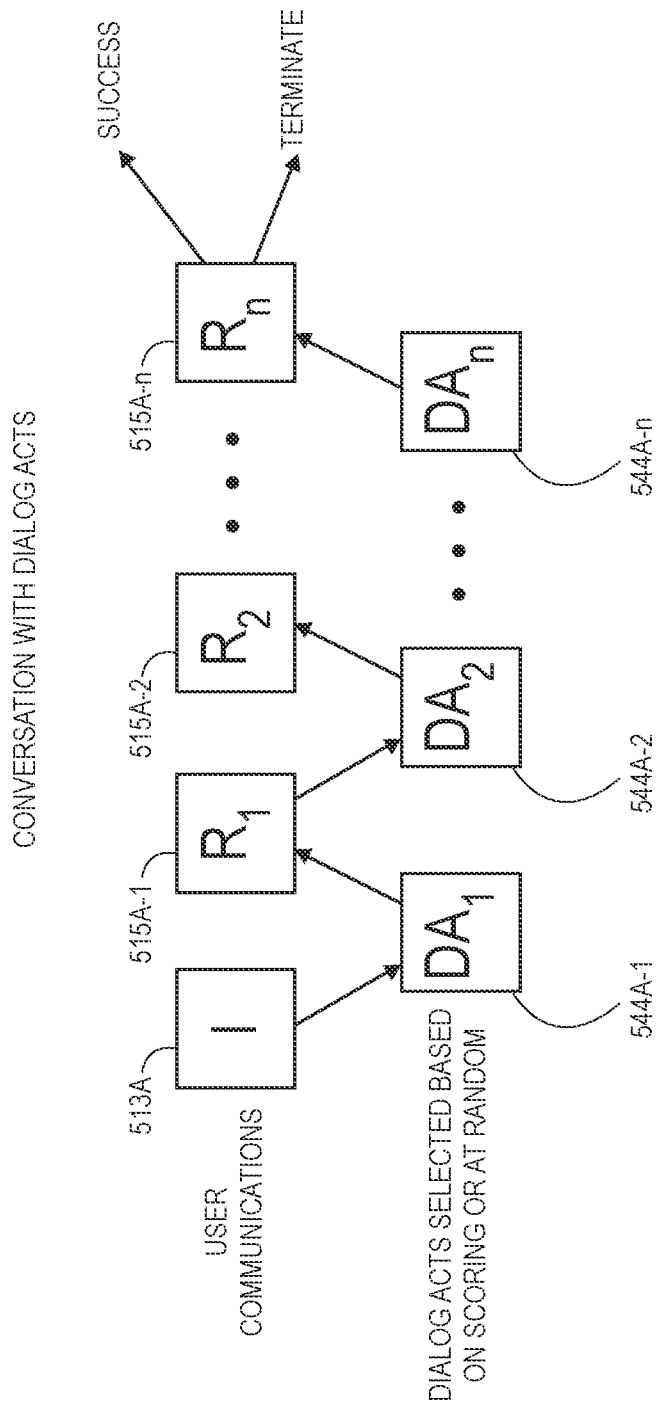
FIG. 5 is a view of aspects of one system for selecting dialog acts in accordance with implementations of the present disclosure.

A machine learning model that has been trained based on dialog states and data regarding conversations including dialog acts selected by another machine learning model may act as a selection policy for selecting dialog acts in response to communications received from users. Referring to FIG. 5, a view of aspects of one system for selecting dialog acts in accordance with implementations of the present disclosure are shown.

As is shown in FIG. 5, when a smart speaker, a mobile device, an automobile, or another computer system captures audio data representing a communication that includes an invocation 513A from a user, a dialog act 544A-1, or $DA_1$, is selected based at least in part on an estimated reward score determined based on one or more outputs received from a machine learning model, e.g., according to a selection policy. A conversation is initiated by presenting the dialog act 544A-1 to the user in reply to the invocation 513A.

In some implementations, the dialog act 544A-1 may be selected based on the estimated reward score exclusively, e.g., where estimated reward scores are calculated for each of a pool of dialog acts in a context determined based on the invocation 513A, and the dialog act 544A-1 has a highest estimated reward score among the pool of dialog acts. Alternatively, the dialog act 544A-1 may be selected subject to a randomization policy, e.g., a fully randomized policy, an exploration algorithm, or in any other manner. The dialog act 544A-1 is presented to the user by the smart speaker, the mobile device, the automobile, or the other computer system. In reply to the dialog act 544A-1, a response 515A-1, or $R_1$, is received from the user. A context of the response 515A-1 may be determined and used to identify a pool of questions, for which estimated rewards scores may be calculated, and a dialog act 544A-2, or $DA_2$, may be selected based on the estimated reward score or at random. In reply to the dialog act 544A-2, a response 515A-2, or $R_2$, is received from the user.

The processes of determining contexts of responses to dialog acts, and selecting dialog acts based on their estimated reward scores in such contexts or at random, may continue for any number of iterations until the conversation is deemed a success or is terminated. As is also shown in FIG. 5A, after an nth dialog act 544A-n, or DAN, is selected based on an estimated reward score or at random and presented to the user, and an nth response 515A-n, or Rn, is received in reply to the dialog act 544A-n, an outcome of the conversation may be determined based on the response 515A-n. For example, the conversation may be deemed successful, or to have satisfied one or more goals, when the response 515A-n of the user satisfies one or more metrics, such as whether the user permitted the system to play a media file for at least a predetermined period of time, or whether the user ultimately purchased an item that was described or recommended by the system. Alternatively, the conversation may be deemed to have been unsuccessful when the response 515A-n of the user does not satisfy the one or more metrics, such as when the user abandons or aborts a goal that may have been identified from the invocation 513A.

Expected rewards of a machine learning model that is trained to identify questions to be asked of users in response to communications based on dialog states and questions asked in prior conversations, or outcomes of such conversations, may be calculated using data captured during such conversations. For example, data captured during conversations initiated with dialog acts selected according to an original machine learning model may be provided to another machine learning model, which may calculate an estimated reward score, or a probability that a given dialog act will result in a successful outcome of a conversation in the context x.

Moreover, any bias associated with an original machine learning model, or conversations that occur based on dialog acts selected by the original machine learning model, may be mitigated using inverse propensity scoring. For example, inverse propensity scoring may be used to calculate an expected reward for a new machine learning model, for each of a plurality of conversations in contexts, in a manner that discounts the importance of actions that were more likely within an original machine learning model than in the new machine learning model. A value of the new machine learning model may be estimated by taking all rewards for which an action according to the original machine learning model is identical to an action predicted by the new machine learning model, and weighing them based on the propensities calculated according to the respective models.

Figure 6:
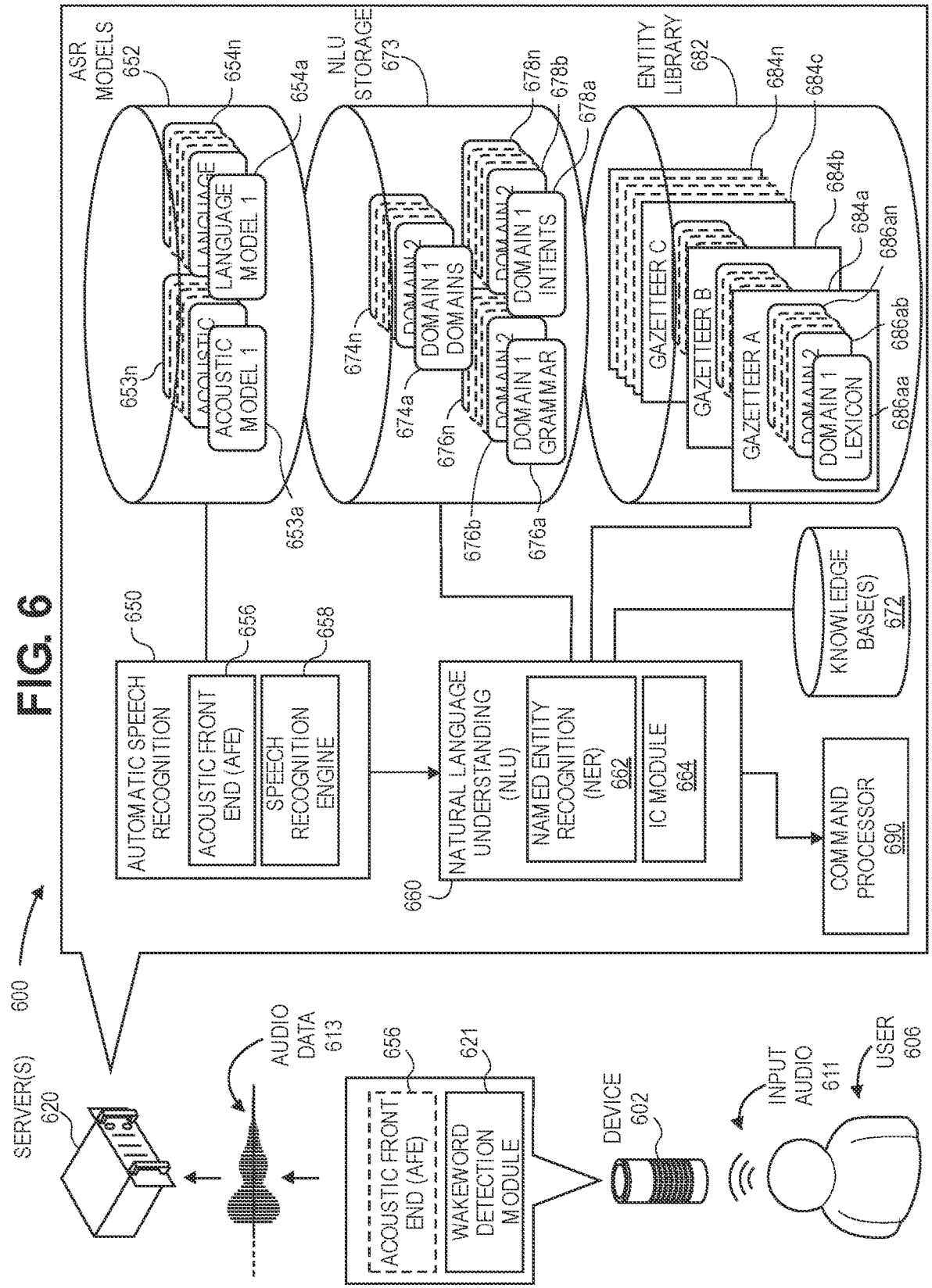
FIG. 6 is a view of aspects of one system for selecting dialog acts in accordance with implementations of the present disclosure.

FIG. 6 is a conceptual diagram of how an utterance spoken by a user is processed, in order to allow a system to capture and execute commands, e.g., spoken commands that may follow a wake word. The various components shown in FIG. 6 may be located on the same physical device, or on different physical devices. Communication between various components illustrated in FIG. 6 may occur directly or across a network. An audio capture component, such as a microphone of device 602, captures input audio 611 corresponding to a spoken utterance from a user 606. The device 602, using a wake word detection module 621, may then process the audio, or audio data corresponding to the audio, to determine if a keyword (such as a wake word) is detected in the audio. Following detection of a wake word, the device sends audio data 613 corresponding to the utterance to a server 620 that includes an ASR module 650. The audio data 613 may be output from an acoustic front end (AFE) 656 located on the device 602 prior to transmission. Or the audio data 613 may be in a different form for processing by a remote AFE 656, such as the AFE 656 located with the ASR module 650.

The wake word detection module 621 works in conjunction with other components of the device, for example, a microphone to detect keywords in the input audio 611. For example, the device 602 may convert input audio 611 into audio data 613, and process the audio data with the wake word detection module 621 to determine whether speech is detected, and, if so, if the audio data comprising speech matches an audio signature and/or model corresponding to a particular keyword.

The device 602 may use various techniques to determine whether audio data includes speech. Some implementations may apply voice activity detection (or "VAD") techniques.

Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other implementations, the device 602 may implement a limited classifier configured to distinguish speech from background noise. The classifier may be implemented by techniques such as linear classifiers, support vector machines, and decision trees. In still other implementations, Hidden Markov Model (or "HMM") or Gaussian Mixture Model (or "GMM") techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the input audio 611 received by the device 602 (or separately from speech detection), the device 602 may use the wake word detection module 621 to perform wake word detection to determine when a user intends to speak a command to the device 602. This process may also be referred to as keyword detection, with the wake word being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wake word detection module 621 may compare audio data to stored models or data to detect a wake word. One approach for wake word detection applies general large vocabulary continuous speech recognition (or "LVCSR") systems to decode the audio signals, with wake word searching conducted in the resulting lattices or confusion networks. LVCSR decoding may require relatively high computational resources. Another approach for wake word spotting builds HMMs for each key wake word and non-wake word speech signal, respectively. The non-wake word speech includes other spoken words, background noise, etc. There can be one or more HMMs built to model the non-wake word speech characteristics, which are named filler models. Viterbi decoding is used to search the best path in the decoding graph, and the decoding output is further processed to make the decision on keyword presence. This approach can be extended to include discriminative information by incorporating hybrid deep neural network (or "DNN")-HMM decoding framework. In another implementation, the wake word spotting system may be built on DNN or recursive neural network (or "RNN") structures directly, without HMM involved. Such a system may estimate the posteriors of wake words with context information, either by stacking frames within a context window for DNN, or using RNN. Following-on, posterior threshold tuning or smoothing is applied for decision making. Other techniques for wake word detection, such as those known in the art, may also be used.

Once the wake word is detected, the local device 602 may "wake" and begin transmitting audio data 613 corresponding to input audio 611 to the server(s) 620 for speech processing. Audio data 613 corresponding to the input audio 611 may be sent to a server 620 for routing to a recipient device or may be sent to the server for speech processing for interpretation of the included speech (e.g., for purposes of executing a command in the speech, or for other purposes). The audio data 613 may include data corresponding to the wake word, or the portion of the audio data corresponding to the wake word may be removed by the local device 602 prior to sending. Further, a local device 602 may "wake" upon detection of speech or spoken audio above a threshold. Upon receipt by the server(s) 620, an automatic speech recognition (or "ASR") module 650 may convert the audio data 613 into text. The ASR module 650 transcribes audio data into text data representing the words of the speech contained in the audio data. The text data may then be used by other components for various purposes, such as executing system commands, inputting data, etc. A spoken utterance in the audio data is input to a processor configured to perform ASR, which then interprets the utterance based on the similarity between the utterance and pre-established language models $654a$-$654n$ stored in an ASR model knowledge base (ASR Models Storage 652). For example, an ASR process may compare the input audio data with models for sounds (e.g., sub-word units or phonemes) and sequences of sounds to identify words that match the sequence of sounds spoken in the utterance of the audio data.

The different ways in which a spoken utterance may be interpreted (e.g., different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model $653a$-$653n$ stored in an ASR Models Storage 652), and the likelihood that a particular word which matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR module 650 outputs the most likely text recognized in the audio data. The ASR module 650 may also output multiple hypotheses in the form of a lattice or an N-best list with each hypothesis corresponding to a confidence score or other score (such as probability scores, etc.).

The device or devices performing ASR processing may include an acoustic front end (or "AFE") 656 and a speech recognition engine 658. The acoustic front end (AFE) 656 transforms the audio data from the microphone into data for processing by the speech recognition engine. The speech recognition engine 658 compares the speech recognition data with acoustic models 653, language models 654, and other data models and information for recognizing the speech conveyed in the audio data. The AFE 656 may reduce noise in the audio data and divide the digitized audio data into frames representing time intervals for which the AFE 656 determines a number of values, called features, representing the qualities of the audio data, along with a set of those values, called a feature vector, representing the features or qualities of the audio data within the frame. Many different features may be determined, as known in the art, and each feature represents some quality of the audio that may be useful for ASR processing. A number of approaches may be used by the AFE 656 to process the audio data, such as mel-frequency cepstral coefficients (or "MFCC"), perceptual linear predictive (or "PLP") techniques, neural network feature vector techniques, linear discriminant analysis, semi-tied covariance matrices, or other approaches known to those of skill in the art.

The speech recognition engine 658 may process the output from the AFE 656 with reference to information stored in speech or model storage (652). Alternatively, post front-end processed data (such as feature vectors) may be received by the device executing ASR processing from another source besides the internal AFE. For example, the device 602 may process audio data into feature vectors (for example using an on-device AFE 656) and transmit that information to a server across a network for ASR processing. Feature vectors may arrive at the server encoded, in which case they may be decoded prior to processing by the processor executing the speech recognition engine 658.

The speech recognition engine 658 attempts to match received feature vectors to language phonemes and words as known in the stored acoustic models 653 and language models 654. The speech recognition engine 658 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that an ASR process will output speech results that make sense grammatically. The specific models used may be general models or may be models corresponding to a particular domain, such as music, banking, etc.

The speech recognition engine 658 may use a number of techniques to match feature vectors to phonemes, for example using HMMs to determine probabilities that feature vectors may match phonemes. Sounds received may be represented as paths between states of an HMI and multiple paths may represent multiple possible text matches for the same sound.

Following ASR processing, the ASR results may be sent by the speech recognition engine 658 to other processing components, which may be local to the device performing ASR and/or distributed across the network(s). For example, ASR results in the form of a single textual representation of the speech, an N-best list including multiple hypotheses and respective scores, lattice, etc., may be sent to a server, such as server 620, for natural language understanding (or "NLU") processing, such as conversion of the text into commands for execution, either by the device 602, by the server 620, or by another device (such as a server running a specific application like a search engine, etc.).

A device performing NLU processing 660 (e.g., server 620) may include various components, including potentially dedicated processor(s), memory, storage, etc. As shown in FIG. 6, an NLU component may include a named entity recognition (or "NER") module 662 which is used to identify portions of query text that correspond to a named entity that may be recognizable by the system. A downstream process called named entity resolution actually links a text portion to an actual specific entity known to the system. To perform named entity resolution, the system may utilize gazetteer information (684a, 684b, 684c . . . 684n) stored in entity library storage 682. The gazetteer information may be used for entity resolution, for example matching ASR results with different entities (such as song titles, user names, etc.). Gazetteers may be linked to users (for example, a particular gazetteer may be associated with a specific user's list or collection of other user contacts), may be linked to certain domains (such as communication), or may be organized in a variety of other ways.

Generally, a NLU process takes textual input (such as processed from ASR 650 based on the utterance input audio 611) and attempts to make a semantic interpretation of the text. That is, a NLU process determines the meaning behind the text based on the individual words and then implements that meaning. NLU processing 660 interprets a text string to derive an intent or a desired action from the user as well as the pertinent pieces of information in the text that allow a device (e.g., device 602) or other service, such as a music service, to complete that action. For example, if a spoken utterance is processed using ASR 650 and outputs the text "Let me hear a song from Foo Fighters," the NLU process may determine that the user intended to initiate a music session using the device 602 and to hear music matching the entity "Foo Fighters" (which may involve a downstream command processor 690 linked with a communication session application).

A NLU may process several textual inputs related to the same utterance. For example, if the ASR 650 outputs N text segments (as part of an N-best list), the NLU may process all N outputs to obtain NLU results.

A NLU process may be configured to parse and tag or otherwise annotate text as part of NLU processing. For example, for the text "Play some Macklemore," "play" may be tagged as a command (to begin the presentation of music or other media) and "Macklemore" may be tagged as a specific entity and target of the command (and an identifier of an entity corresponding to "Macklemore" may be included in the annotated result). For the text "Call Mom, "call" may be tagged as a command (e.g., to execute a phone call), and "Mom" may be tagged as a specific entity and target of the command (and an identifier of an entity corresponding to "Mom" may be included in the annotated result). Further, the NLU process may be used to provide answer data in response to queries, for example, using the knowledge base 672.

To correctly perform NLU processing of speech input, an NLU process 660 may be configured to determine a "domain" of the utterance so as to determine and narrow down which services offered by the endpoint device (e.g., server 620 or device 602) may be relevant. For example, an endpoint device may offer services relating to interactions with a communication service, a contact list service, a calendar/scheduling service, a music player service, etc. Words in a single text query may implicate more than one service, and some services may be functionally linked (e.g., both a communication service and a calendar service may utilize data from the contact list).

The name entity recognition (or "NER") module 662 receives a query in the form of ASR results and attempts to identify relevant grammars and lexical information that may be used to construe meaning. To do so, the NER module 662 may begin by identifying potential domains that may relate to the received query. The NLU storage 673 includes a database of devices (674a-674n) identifying domains associated with specific devices. For example, the device 602 may be associated with domains for music, communication sessions, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "music," "communication session," "shopping," "calendaring," etc. As such, each domain may be associated with a particular language model and/or grammar database (676a, 676b . . .

676*n*), a particular set of intents/actions (678*a*, 678*b*-678*n*), and a particular personalized lexicon (686). Each gazetteer (684*a*-684*n*) may include domain-indexed lexical information associated with a particular user and/or device. For example, the Gazetteer A (684*a*) includes domain-index lexical information 686*aa*, 686*ab*-686*an*. A user's music-domain lexical information might include album titles, artist names, and song names, for example, whereas a user's contact-list lexical information might include the names of contacts, identifiers for devices associated with those contacts, device characteristics, etc. Since every user's music collection and contact list is presumably different, this personalized information improves entity resolution.

As noted above, in traditional NLU processing, a query may be processed applying the rules, models, and information applicable to each identified domain. For example, if a query potentially implicates both communications and music, the query may, substantially in parallel, be NLU processed using the grammar models and lexical information for communications, and will be processed using the grammar models and lexical information for music. The responses based on the query produced by each set of models is scored, with the overall highest ranked result from all applied domains ordinarily selected to be the correct result.

An intent classification (or "IC") module 664 parses the query to determine an intent or intents for each identified domain, wherein the intent corresponds to the action to be performed that is responsive to the query. Each domain is associated with a particular set of intents/actions (678*a*-678*n*) of words linked to intents. For example, a music intent may link words and phrases such as "quiet," "volume off," and "mute" to a "mute" intent. The IC module 664 identifies potential intents for each identified domain by comparing words in the query to the words and phrases in the set of intents actions 678 for that domain. Traditionally, the determination of an intent by the IC module is performed using a set of rules or templates that are processed against the incoming text to identify a matching intent.

In order to generate a particular interpreted response, the NER 662 applies the grammar models and lexical information associated with the respective domain to actually recognize and mention one or more entities in the text of the query. In this manner, the NER 662 identifies "slots" (i.e., particular words in query text) that may be needed for later command processing. Depending on the complexity of the NER 662, it may also label each slot with a type of varying levels of specificity (such as noun, place, city, artist name, song name, or the like). Each grammar model 676 includes the names of entities (i.e., nouns) commonly found in speech about the particular domain (i.e., generic terms), whereas the lexical information 686 from the gazetteer 684 is personalized to the user(s) and/or the device. For instance, a grammar model associated with a music domain, a communication session domain or a shopping domain may include a database of words commonly used when people discuss music, communication sessions or shopping, respectively, and/or constraints to include with music, communication sessions or shopping, respectively.

The intents identified by the IC module 664 are linked to domain-specific grammar frameworks (included in 676) with "slots" or "fields" to be filled. Each slot or field corresponds to a portion of the query text that the system believes corresponds to an entity. For example, if "Play music" is an identified intent, a grammar framework or frameworks 676 may correspond to sentence structures such as "Play {Artist Name}," "Play {Album Name}," "Play {Song Name}," "Play {Song Name} by {Artist Name}," etc. However, to make resolution more flexible, these frameworks would ordinarily not be structured as sentences, but rather based on associating slots with grammatical tags.

For example, the NER module 662 may parse the query to identify words as subject, object, verb, preposition, etc., based on grammar rules and/or models, prior to recognizing named entities. The identified verb may be used by the IC module 664 to identify intent, which is then used by the NER module 662 to identify frameworks. A framework for an intent of "play" may specify a list of slots or fields applicable to play the identified "object" and any object modifier (e.g., a prepositional phrase), such as {Artist Name}, {Album Name}, {Song name}, etc. The NER module 662 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type or semantic meaning. Parsing may be performed using heuristic grammar rules, or an NER model may be constructed using techniques such as hidden Markov models, maximum entropy models, log linear models, conditional random fields (CRF), and the like.

For instance, a query of "play Man in the Box by Alice in Chains" might be parsed and tagged as {Verb}: "Play," {Object}: "Man in the Box," {Object Preposition}: "by," and {Object Modifier}: "Alice in Chains." At this point in the process, "Play" may be identified as a verb based on a word database associated with the music domain, which the IC module 664 will determine corresponds to the "play music" intent. Even if no determination has been made as to the meaning of "Man in the Box" and "Alice in Chains," but, based on grammar rules and models, it may be determined that the text of these phrases relates to the grammatical objects (i.e., entity) of the query.

The frameworks linked to the intent are then used to determine what database fields should be searched to determine the meaning of these phrases, such as searching a user's gazetteer for similarity with the framework slots. A framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot or field using gazetteer information, the NER module 662 may search the database of generic words associated with the domain (in the storage 673). For example, if a query was "play songs by Heart," after failing to determine an album name or song name called "songs" by "Heart," the NER module 662 may search the domain vocabulary for the word "songs." In the alternative, generic words may be checked before the gazetteer information, or both may be tried, potentially producing two different results.

The comparison process used by the NER module 662 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER module 662 may also use contextual operational rules to fill slots. For example, if a user had previously requested to pause a particular song and thereafter requested the voice-controlled device to "please un-pause my music," the NER module 662 may apply an inference-based rule to fill a slot associated with the name of the song that the user currently wishes to play, namely, a song that was playing at the time that the user requested to pause the music.

The results of NLU processing may be tagged to attribute meaning to the query. So, for instance, "play Long Road by Pearl Jam" might produce a result of: {domain} Music, {intent} Play Music, {artist name} "Pearl Jam," {media type} song, and {song title} "Long Road." As another example, "play songs by Pearl Jam" might produce: {domain} Music, {intent} Play Music, {artist name} "Pearl Jam," and {media type} song.

The output from the NLU processing (which may include tagged text, commands, etc.) may then be sent to a command processor 690, which may be located on a same or separate server 620 as part of system 600. The destination command processor 690 may be determined based on the NLU output. For example, if the NLU output includes a command to play music, or to establish a communication session, the destination command processor 690 may be a music application or a communication application, such as one located on device 602 or in another device associated with the user.

Figure 7:
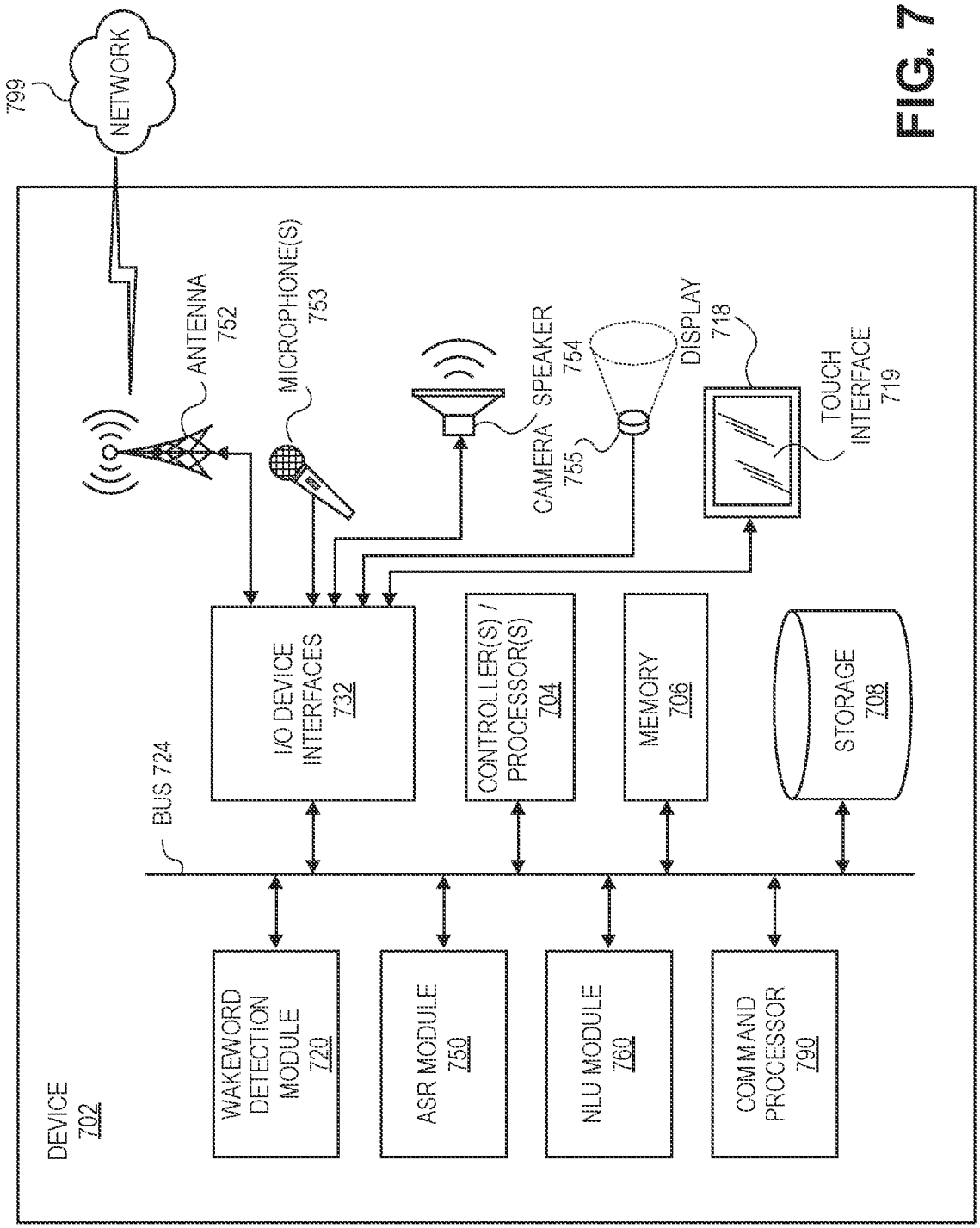
FIG. 7 is a view of aspects of one system for selecting dialog acts in accordance with implementations of the present disclosure.
Figure 8:
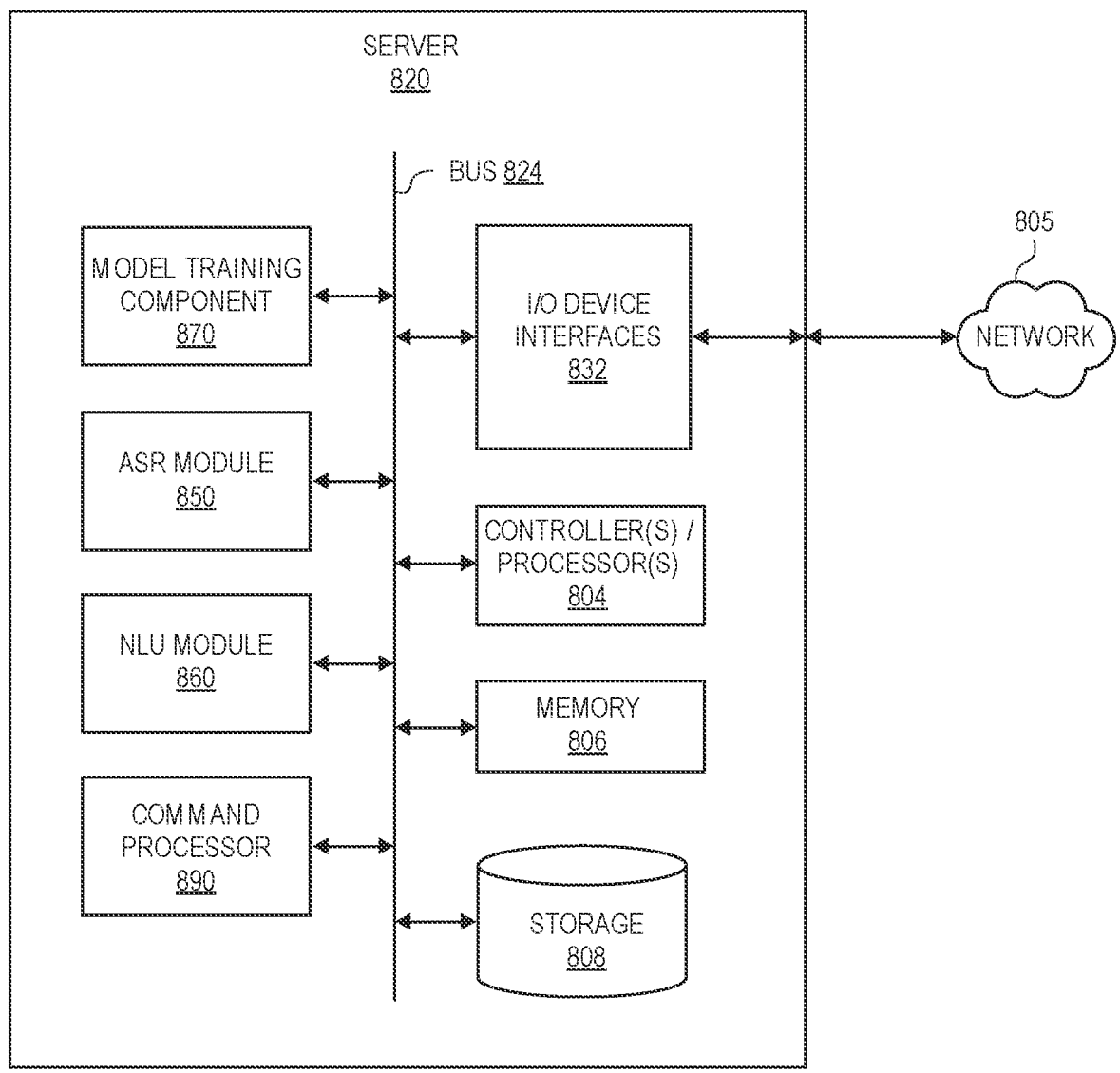
FIG. 8 is a view of aspects of one system for selecting dialog acts in accordance with implementations of the present disclosure.

FIG. 7 is a block diagram conceptually illustrating a local device 702 that may be used with the described system. FIG. 8 is a block diagram conceptually illustrating example components of a remote device, such as a remote server 820 that may assist with ASR, NLU processing, or command processing. Multiple such servers 820 may be included in the system, such as one server(s) 820 for training ASR models, one server(s) for performing ASR, one server(s) 820 for performing NLU, etc. In operation, each of these devices (or groups of devices) may include computer-readable and computer-executable instructions that reside on the respective device 702/820, as will be discussed further below.

Each of these devices 702/820 may include one or more controllers/processors 704/804), that may each include a central processing unit (or "CPU") for processing data and computer-readable instructions, and a memory 706/806 for storing data and instructions of the respective device. The memories 706/806 may individually include volatile random access memory (RAM), non-volatile read only memory (ROM), non-volatile magnetoresistive (MRAM) and/or other types of memory. Each device may also include a data storage component 708/808, for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces 732/832.

Computer instructions for operating each device 702/820 and its various components may be executed by the respective device's controller(s)/processor(s) 704/804, using the memory 706/806 as temporary "working" storage at run-time. A device's computer instructions may be stored in a non-transitory manner in non-volatile memory 706/806, storage 708/808, or an external device(s). Alternatively, some or all of the executable instructions may be embedded in hardware or firmware on the respective device in addition to or instead of software.

Each device 702/820 includes input/output device interfaces 732/832. A variety of components may be connected through the input/output device interfaces, as will be discussed further below. Additionally, each device 702/820 may include an address/data bus 724/824 for conveying data among components of the respective device. Each component within a device 702/820 may also be directly connected to other components in addition to (or instead of) being connected to other components across the bus 724/824.

Referring to the device 702 of FIG. 7, the device 702 may include a display 718, which may comprise a touch interface 719. Alternatively, the device 702 may be "headless" and may primarily rely on spoken commands for input. As a way of indicating to a user that a connection between another device has been opened, relay constraint notification, etc., the device 702 may be configured with a visual indicator, such as an LED or similar illumination element, that may change color, flash, or otherwise provide visual indications by the device 702. The device 702 may also include input/output device interfaces 732 that connect to a variety of components such as an audio output component such as a speaker 754, an imaging device such as a camera 755, a wired headset or a wireless headset, and/or other components capable of outputting audio. The device 702 may also include an audio capture component. The audio capture component may be, for example, a microphone 753 or array of microphones, a wired headset or a wireless headset, etc. The microphone 753 may be configured to capture audio, such as phrases or utterances from a user. If an array of microphones is included, approximate distance to a sound's point of origin may be determined using, for example, acoustic localization based on time and amplitude differences between sounds captured by different microphones of the array. The device 702 (using microphone 753, wake word detection module 720, ASR module 750, etc.) may be configured to determine audio data corresponding to detected audio data. The device 702 (using input/output device interfaces 732, antenna 752, etc.) may also be configured to transmit the audio data to the server 820 for further processing or to process the data using internal components such as a wake word detection module 720.

For example, via the antenna(s), the input/output device interfaces 732 may connect to one or more networks 799/805 via a wireless local area network (WLAN) (such as Wi-Fi) radio, Bluetooth, and/or wireless network radio, such as a radio capable of communication with a wireless communication network such as a Long-Term Evolution (LTE) network, WiMAX network, 3G network, 5G network, etc. A wired connection such as Ethernet may also be supported. Through the network(s) 799/805, the speech processing system may be distributed across a networked environment.

The device 702 and/or server 820 may include an ASR module 750/850. The ASR module 750 in device 702 may be of limited or extended capabilities or may not be included in the device 702. The ASR module(s) may include the language models stored in the ASR model storage component, and perform the automatic speech recognition process. If limited speech recognition is included on the device 702, the ASR module 750 may be configured to identify a limited number of words, such as keywords detected by the device, whereas extended speech recognition may be configured to recognize a much larger range of words.

The device 702 and/or server 820 may include a limited or extended NLU module 760/860. The NLU module in device 702 may be of limited or extended capabilities, or may not be included on the device 702. The NLU module(s) may comprise the name entity recognition module, the intent classification module and/or other components, as discussed above. The NLU module(s) may also include a stored knowledge base and/or entity library, or those storages may be separately located.

The device 702 and/or server 820 may also include a command processor 790/890 that is configured to execute commands or functions associated with a spoken command as described above.

The device 702 may include a wake word detection module 720, which may be a separate component or may be included in an ASR module 750. The wake word detection module 720 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some implementations, the device 702 may be configured collectively to identify a set of the directional audio signals in which the wake expression is detected or in which the wake expression is likely to have occurred.

The wake word detection module 720 receives captured audio and processes the audio to determine whether the audio corresponds to particular keywords recognizable by the device 702 and/or system. The storage 708 may store data relating to keywords and functions to enable the wake word detection module 720 to perform the algorithms and methods described above. The locally stored speech models may be pre-configured based on known information, prior to the device 702 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 702 prior to the user device 702 being delivered to the user or configured to access the network by the user. The wake word detection module 720 may access the storage 708 and compare the captured audio to the stored models and audio sequences using audio comparison, pattern recognition, keyword spotting, audio signature, and/or other audio processing techniques.

The server may include a model training component 870. The model training component may be used to train the classifiers or models discussed above.

As noted above, multiple devices may be employed in a single speech processing system. In such a multi-device system, each of the devices may include different components for performing different aspects of the speech processing. The multiple devices may include overlapping components. The components of the devices 702 and server 820, as illustrated in FIGS. 7 and 8, are exemplary, and may be located as a stand-alone device or may be included, in whole or in part, as a component of a larger device or system.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the process represented in the flow chart of FIGS. 3A and 3B, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system comprising:
a server having at least one data store and at least one computer processor, wherein the server is in communication with at least one smart speaker over one or more networks, and
wherein the server is programmed with one or more sets of instructions that, when executed by the processor, cause the server to perform a method comprising:
receiving first data from a first smart speaker over the one or more networks, wherein the first data comprises:
first audio data captured by one or more sensors of the first smart speaker; and
at least a first context feature regarding one of the first audio data captured by one or more sensors of the first smart speaker or a first user of the first smart speaker;
determining that the first audio data comprises a first invocation to initiate a first conversation;
in response to determining that the first audio data comprises the first invocation,
determining a first context of the first invocation based at least in part on the first context feature; and
determining scores of each of a first set of questions based at least in part on the first context, wherein each of the scores is a probability that one of the first set of questions will cause the first conversation to have a successful outcome;
transmitting second data for presenting a first question of the first set of questions to the first smart speaker over the one or more networks, wherein the first question has a highest score of the first set of questions;
receiving third data from the first smart speaker over the one or more networks;
determining a first outcome of the first conversation based at least in part on the third data;
receiving fourth data from a second smart speaker of the plurality of smart speakers over the one or more networks, wherein the fourth data comprises:
second audio data captured by one or more sensors of the second smart speaker; and
at least a second context feature regarding one of the second audio data captured by one or more sensors of the second smart speaker or a second user of the second smart speaker;
determining that the second audio data comprises a second invocation to initiate a second conversation;
in response to determining that the second audio data comprises the second invocation,
determining a second context of the second invocation based at least in part on the second context feature; and
determining scores of each of a second set of questions based at least in part on the second context, wherein each of the scores is a probability that one of the second set of questions will cause the second conversation to have a successful outcome;
selecting a second question of the second plurality of questions according to a randomization policy;
transmitting fifth data for presenting the second question to the second smart speaker over the one or more networks;
receiving sixth data from the second smart speaker over the one or more networks;
determining a second outcome of the second conversation based at least in part on the sixth data;
training a machine learning model to score questions based on a context of an invocation using a training set of data comprising:
the third data;
the first outcome;
the sixth data; and
the second outcome.

2. The system of claim 1, wherein the method further comprises:
receiving seventh data from a third smart speaker over the one or more networks, wherein the seventh data comprises:
third audio data captured by one or more sensors of the third smart speaker; and
at least a third context feature regarding one of the third audio data captured by the one or more sensors of the third smart speaker or a third user of the third smart speaker;
determining that the third audio data captured by the one or more sensors of the third smart speaker comprises a third invocation;
in response to determining that the third audio data comprises the third invocation,
providing at least the third context feature and a third set of questions as inputs to the machine learning model;
receiving at least one output from the machine learning model;
selecting a third question of the third set of questions based at least in part on the at least one output; and
transmitting eighth data for presenting the third question to the third user by the third smart speaker over the one or more networks.

3. The system of claim 2, wherein the third context feature is one of:
an identifier of the third user;
a time or a data at which the audio data was captured by the third smart speaker;
a location of the third smart speaker;
a number of words included in the third audio data captured by the third smart speaker; or
an indication of at least one of a genre preferred by the third user, a mood preferred by the third user, an artist preferred by the third user or a group preferred by the third user.

4. The system of claim 1, wherein the success metric is one of:
a playing of a media file for at least a predetermined period of time following a presentation of a question to a user; or
a purchase of at least one item following a presentation of a question to a user.

5. A method comprising:
receiving, by a first computer system from a second computer system over at least one network, first data identifying a first invocation to initiate a first conversation, and wherein the first data is derived at least in part from at least a first audio signal of a first user captured by the second computer system;

determining, by the first computer system, a first context associated with the first invocation based at least in part on the first data;

calculating, by a first machine learning model executed by the first computer system, a first plurality of reward scores based at least in part on the first context, wherein each of the first plurality of reward scores is calculated for one of a first plurality of dialog acts, and wherein the each of the first plurality of reward scores is a probability that a first outcome of the first conversation will satisfy a predetermined metric;

selecting, by the first computer system, a first dialog act of the first plurality of dialog acts according to a randomization policy, wherein the first dialog act is selected based at least in part on a first dialog score calculated for the first dialog act;

transmitting, by the first computer system to the second computer system over the at least one network, second data for presenting the first dialog act to the first user;

receiving, by the first computer system from the second computer system over the at least one network, third data derived at least in part from at least a second audio signal of the first user captured by the second computer system in response to the first dialog act;

determining, by the first computer system, the first outcome of the first conversation based at least in part on the third data;

storing, by the first computer system, a first dialog state of the first conversation in at least one data store, wherein the first dialog state comprises:
an identifier of the first dialog act;
the first reward score;
at least a portion of the third data; and
an identifier of the first outcome of the first conversation; and training, by the first computer system, at least one of the first machine learning model or a second machine learning model to calculate a reward score for a dialog act in a context based at least in part on the first dialog state and a second dialog state of a second conversation, wherein the second dialog state comprises:
an identifier of a second dialog act presented to a second user by a third computer device in response to a second invocation to initiate the second conversation;
a second reward score calculated for the second dialog act by the first machine learning model, wherein the second reward score is a highest reward score of a second plurality of reward scores calculated based at least in part on a second context of the second conversation, wherein each of the second plurality of reward scores is calculated for one of a second plurality of dialog acts, and wherein each of the second plurality of reward scores is a probability that the second outcome of the second conversation will satisfy the predetermined metric;
at least a portion of fourth data received by the first computer system from the third computer system in response to the second dialog act; and
an identifier of the second outcome of the second conversation.

6. The method of claim 5, further comprising:
receiving, by the first computer system, fourth data from a fourth computer system identifying a third invocation to initiate a third conversation, wherein the fourth data is derived at least in part from at least a third audio signal of a third user captured by the fourth computer system;
determining, by the first computer system, a third context associated with the third invocation based at least in part on the fourth data;
providing, by the first computer system, at least a portion of the fourth data and the second context to the at least one of the first machine learning model or the second machine learning model as inputs;
receiving, by the first computer system, at least one output in response to the inputs;
selecting, by the first computer system, a third dialog act based at least in part on the at least one output; and
transmitting, by the first computer system to the fourth computer system, fifth data for presenting the third dialog act to the third user.

7. The method of claim 5, wherein training the at least one of the first machine learning model or the second machine learning model comprises:
training, by the first computer system, a plurality of machine learning models to calculate the reward score of the dialog act in the context based at least in part on the first dialog state, wherein the second machine learning model is one of the plurality of machine learning models;
selecting, by the first computer system, one of the plurality of machine learning models based at least in part on at least one metric, wherein the second machine learning model is the selected one of the plurality of machine learning models; and
configuring the first computer system to execute the second machine learning model.

8. The method of claim 5, further comprising:
identifying, by the first computer system, a first media file based at least in part on the third data; and
transmitting, by the first computer system to the second computer system, fourth data for the first media file to be played by the second computer system.

9. The method of claim 8, further comprising:
determining, by the first computer system, that the first media file was played by the second computer system for at least a predetermined period of time,
wherein determining the first outcome of the first conversation comprises:
in response to determining that the first media file was played by the second computer system for at least the predetermined period of time,
determining, by the first computer system, that the first conversation was successful.

10. The method of claim 5, further comprising:
receiving, by the first computer system from the second computer system, fourth data comprising a request to purchase at least one item,
wherein determining the first outcome of the first conversation comprises:
in response to determining that the fourth data comprises the request to purchase the at least one item,
determining, by the first computer system, that the first conversation was successful.

11. The method of claim 5, wherein the randomization policy is a softmax exploration algorithm.

12. The method of claim 5, wherein the randomization policy is fully randomized.

13. The method of claim 5, wherein determining the first outcome of the first conversation comprises:
    determining, by the first computer system, at least one metric for at least the first conversation; and
    determining, by the first computer system, that the at least one metric has not been met based at least in part on the third data,
    wherein determining the first outcome of the first conversation comprises:
    in response to determining that the at least one metric has not been met based at least in part on the third data,
    determining, by the first computer system, that the first conversation was not successful.

14. The method of claim 5, wherein determining the first context associated with the first invocation comprises:
    determining at least a first context feature based at least in part on the first data, wherein the first context feature is one of:
        an identifier of the first user;
        a time or a date at which the first audio signal was captured by the second computer system;
        a location of the second computer system;
        a number of words included in the first audio signal; or
        an indication of at least one of a genre preferred by the first user, a mood preferred by the first user, an artist preferred by the first user or a group preferred by the first user.

15. The method of claim 5, wherein the second machine learning model is one of:
    an artificial neural network;
    a multi-armed bandit algorithm;
    a boosting algorithm; or
    a regression model.

16. The method of claim 5, wherein the first data comprises a plurality of arguments,
    wherein a first one of the plurality of arguments is a wake word, and
    wherein the first data is transmitted by the second computer system to the first computer system in response to determining, by the second computer system, that the first one of the plurality of arguments is the wake word.

17. The method of claim 5, wherein the second computer device is at least a portion of at least one of:
    a smart speaker;
    a mobile device; or
    an automobile.

18. A computer system connected to one or more networks, wherein the computer system comprises at least one computer processor and at least one data store, and
    wherein the computer system is programmed with one or more sets of instructions that, when executed by the at least one computer processor, cause the computer system to at least:
    receive a plurality of sets of data over the one or more networks, wherein each of the sets of data is received from one from a plurality of remote computer systems, and each of the sets of data comprises an invocation to initiate a conversation and at least one context feature associated with the invocation;
    determine contexts of each of the invocations, wherein each of the contexts is determined based at least in part on the at least one context feature associated with one of the invocations;
    identify, for each of the invocations, a pool of dialog acts, wherein each of the pools of dialog acts comprises at least one question to be asked in reply to one of the invocations;
    calculate, for each of the pools of dialog acts, reward scores of each of the dialog acts of the pools based at least in part on the contexts of the pools, wherein each of the reward scores is a probability that one of the dialog acts will result in a successful conversation;
    initiate a first set of conversations with each of a first subset of the plurality of remote computer systems, wherein initiating the first set of conversations with each of the first subset of the plurality of remote computer systems comprises:
        identifying a dialog act having a highest reward score of one of the pools of dialog acts comprising the at least one question to be asked in reply to one of the invocations; and
        transmitting data comprising the dialog act selected from the one of the pools to one of the plurality of remote computer systems;
    initiate a second set of conversations with each of a second subset of the plurality of remote computer systems, wherein initiating the second set of conversations comprises transmitting data comprising:
        selecting a dialog act in accordance with a randomization policy from one of the pools of dialog acts comprising the at least one question to be asked in reply to one of the invocations; and
        transmitting data comprising the dialog act selected from the one of the pools in accordance with the randomization policy to one of the plurality of remote computer systems;
    determine dialog states of each of the first set of conversations and the second set of conversations, wherein each of the dialog states comprises:
        an identifier of at least one dialog act of one of the first set of conversations or the second set of conversations;
        a reward score of the at least one dialog act; and
        an identifier of an outcome of the one of the first set of conversations or the second set of conversations;
    train a machine learning model to calculate a dialog score for a dialog act in a context based at least in part on the dialog states;
    receive a first set of data from a first remote computer system over the one or more networks, wherein the first set of data comprises a first invocation to initiate a conversation and at least a first context feature associated with the first invocation;
    provide at least the first set of data to the machine learning model as an input;
    receive at least one output from the machine learning model in response to the input;
    calculate, based at least in part on the at least one output, a first plurality of reward scores, wherein each of the first plurality of reward scores is calculated for one of a first pool of dialog acts in the first context;
    select, based at least in part on the reward scores, a first dialog act of the first pool of dialog acts based at least in part on a first reward score calculated for the first dialog act; and
    transmit data for presenting at least the first dialog act to the first remote computer system over the network.

19. The computer system of claim 18, wherein the at least one context feature associated with each of the invocations is one or more of:
    an identifier of a user of one of the remote computer systems;

a time or a data at which one of the sets of data was captured by one of the remote computer systems; or a location of the one of the remote computer systems.

20. The computer system of claim 18, wherein each of the remote computer systems is one of:

a smart speaker;

a mobile device; or an automobile.

\* \* \* \* \*